US012715980B2

(12) United States Patent
Desrats et al.

(10) Patent No.: US 12,715,980 B2
(45) Date of Patent: Aug. 25, 2026

(54) STABILIZER COMPOSITION FOR SILYL-MODIFIED POLYMER SEALANTS

(71) Applicants: CLARIANT INTERNATIONAL LTD, Muttenz (CH); OMYA INTERNATIONAL AG, Oftringen (CH)

(72) Inventors: Jean-Yves Desrats, Mulhouse (FR); Antonio Di Risio, Koenigstein im Taunus (DE); Mouhcine Kanouni, Tampa, FL (US); Andrea Battisti, Zürich (CH); David Grassini, Albizzate (IT)

(73) Assignees: CLARIANT INTERNATIONAL LTD, Muttenz (CH); OMYA INTERNATIONAL AG, Oftringen (CH)

( * ) Notice: Subject to any disclaimer, the term of this patent is extended or adjusted under 35 U.S.C. 154(b) by 604 days.

(21) Appl. No.: 17/624,863

(22) PCT Filed: Jul. 10, 2020

(86) PCT No.: PCT/EP2020/069511

§ 371 (c)(1),
(2) Date: Jan. 5, 2022

(87) PCT Pub. No.: WO2021/005201

PCT Pub. Date: Jan. 14, 2021

(65) Prior Publication Data

US 2022/0259410 A1 Aug. 18, 2022

(30) Foreign Application Priority Data

Jul. 10, 2019 (EP) .................................... 19185580

(51) Int. Cl.

| | |
|---|---|
| ***C09K 15/30*** | (2006.01) |
| ***C08G 65/336*** | (2006.01) |
| ***C08K 13/00*** | (2006.01) |
| ***C08K 13/06*** | (2006.01) |
| ***C09J 11/04*** | (2006.01) |
| ***C09J 11/06*** | (2006.01) |
| ***C09J 171/02*** | (2006.01) |
| ***C09K 3/10*** | (2006.01) |
| ***C09K 15/20*** | (2006.01) |
| *C08K 5/11* | (2006.01) |
| *C08K 5/205* | (2006.01) |
| *C08K 5/3435* | (2006.01) |
| *C08K 5/3475* | (2006.01) |
| *C08K 5/353* | (2006.01) |
| *C08K 9/04* | (2006.01) |

(52) U.S. Cl.

CPC ............ *C08K 13/06* (2013.01); *C08G 65/336* (2013.01); *C08K 13/00* (2013.01); *C09J 11/04* (2013.01); *C09J 11/06* (2013.01); *C09J 171/02* (2013.01); *C09K 3/1018* (2013.01); *C09K 15/20* (2013.01); *C09K 15/30* (2013.01); *C08K 5/11* (2013.01); *C08K 5/205* (2013.01); *C08K 5/3435* (2013.01); *C08K 5/3475* (2013.01); *C08K 5/353* (2013.01); *C08K 9/04* (2013.01); *C09K 2200/047* (2013.01); *C09K 2200/0476* (2013.01); *C09K 2200/0657* (2013.01)

(58) Field of Classification Search

CPC ................................ C09K 15/20; C09K 15/30
See application file for complete search history.

(56) References Cited

U.S. PATENT DOCUMENTS

| | | | | |
|---|---|---|---|---|
| 3,971,751 | A | 7/1976 | Isayama et al. | |
| 4,340,534 | A | 7/1982 | Wiezer et al. | |
| 5,969,014 | A | 10/1999 | Webster et al. | |
| 6,077,896 | A | 6/2000 | Yano et al. | |
| 6,174,940 | B1 | 1/2001 | Staehrfeldt et al. | |
| 6,270,692 | B1 | 8/2001 | Geissler et al. | |
| 6,521,681 | B1 | 2/2003 | Zingg et al. | |
| 6,787,591 | B2 * | 9/2004 | Koch ..................... | C08K 5/353 524/502 |
| 6,790,903 | B1 | 9/2004 | Majolo et al. | |
| 6,916,867 | B2 | 7/2005 | Gugumus | |
| 7,297,734 | B2 | 11/2007 | Mehrer | |

(Continued)

FOREIGN PATENT DOCUMENTS

| | | |
|---|---|---|
| CL | 199902919 | 9/2000 |
| CN | 1444624 A | 9/2003 |

(Continued)

OTHER PUBLICATIONS

Office Action and Search Report dated Sep. 28, 2022, issued in corresponding Russian Patent Application No. 2022103165.

(Continued)

*Primary Examiner* — Vickey Nerangis
(74) *Attorney, Agent, or Firm* — RAPHAEL BELLUM PLLC

(57) ABSTRACT

The present invention is directed to stabilizer compositions comprising at least one oxalanilide UV absorber, at least one hindered amine light stabilizer (HALS), at least one phenolic antioxidant and optionally further components. Said stabilizer compositions are preferably used in sealants or adhesives based on silyl-modified polymers (SMP). The invention is also directed to a polymer composition based on silyl-modified polymers (SMP) comprising the inventive stabilizer combination of oxalanilide UV absorber, hindered amine light stabilizer (HAL S) and phenolic antioxidant.

6 Claims, 4 Drawing Sheets

(56) References Cited

U.S. PATENT DOCUMENTS

| | | | | |
|---|---|---|---|---|
| 8,343,304 | B2 | 1/2013 | Burckhardt | |
| 2002/0198308 | A1 | 12/2002 | Lucas | |
| 2003/0105261 | A1 | 6/2003 | Komitsu et al. | |
| 2005/0228086 | A1 | 10/2005 | Mehrer | |
| 2005/0250889 | A1* | 11/2005 | Malik | C08K 5/353 252/397 |
| 2010/0087576 | A1 | 4/2010 | Prasse | |

FOREIGN PATENT DOCUMENTS

| | | | |
|---|---|---|---|
| CN | 101824163 | A | 9/2010 |
| CN | 103025809 | A | 4/2013 |
| CN | 106833479 | A | 6/2017 |
| CN | 107892900 | A | 4/2018 |
| DE | 19958525 | A1 | 6/2000 |
| EP | 1288247 | A1 | 3/2003 |
| EP | 1925628 | A1 | 5/2008 |
| GB | 1440391 | A | 6/1976 |
| JP | 2004-506055 | A | 2/2004 |
| JP | 2010/248408 | A | 11/2010 |
| JP | 2010/270241 | A | 12/2010 |
| JP | 2013-535535 | A | 9/2013 |
| RU | 2197508 | C2 | 1/2003 |
| RU | 2513108 | C2 | 4/2014 |
| WO | 02/12385 | A1 | 2/2002 |
| WO | 2012/010570 | A1 | 1/2012 |
| WO | 2016/081823 | A1 | 5/2016 |

OTHER PUBLICATIONS

Office Action dated Mar. 17, 2022, issued in corresponding Indian Patent Application No. 202117049585.

Office Action dated Mar. 8, 2023, issued in corresponding Japanese Patent Application No. 2022-500545.

Office Action dated Apr. 13, 2023, issued in corresponding Chilean Patent Application No. 202103130.

Office Action dated Feb. 11, 2023, issued in corresponding Chinese Patent Application No. 202080034565.5.

International Search Report and Written Opinion dated Oct. 14, 2020, issued in corresponding International Patent Application No. PCT/EP2020/069511.

International Preliminary Report on Patentability (IPRP) dated Jun. 7, 2021, issued in corresponding International Patent Application No. PCT/EP2020/069511.

* cited by examiner

STABILIZER COMPOSITION FOR SILYL-MODIFIED POLYMER SEALANTS

The present invention is directed to stabilizer compositions comprising at least one oxalanilide UV absorber, at least one hindered amine light stabilizer (HALS), at least one phenolic antioxidant and optionally further components. Said stabilizer compositions are preferably used in sealants or adhesives based on silyl-modified polymers (SMP). The invention also deals with a polymer composition based on silyl-modified polymers (SMP) comprising the new stabilizer combination of oxalanilide UV absorber, hindered amine light stabilizer (HALS) and phenolic antioxidant.

Furthermore, the invention is directed to a process for preparing the stabilizer compositions and the use of these stabilizer compositions as heat and/or UV stabilizer in SMP sealants and adhesives.

Silyl-modified polymers (SMP), such as silyl-modified polyethers (also known as MS polymers), silyl-modified polyurethanes (also known as SPUR polymers), and silyl-modified acrylic polymers, as well as their use as sealants and adhesives for example in the building and construction industry, are known for many years, see e.g. US 2002/198308, U.S. Pat. No. 6,077,896, EP-A 1 288 247, and US 2003/0105261. Examples of commercial SMP products are Kaneka MS Polymers (such as MS Polymer® S203H, MS Polymer® S303H) or Polymers ST from Evonik. A broad range of MS Polymer grades are commercially available, which differ in degree of functionalization (number and nature of groups attached to the backbone) and backbone structure in a wide viscosity range.

Such silyl-modified polymers can be the basis of moisture-curable 1K or 2K sealant or adhesive compositions, wherein such compositions can be stored in a substantially moisture free state and, when exposed to atmospheric conditions, rapidly undergoes curing from the surface. Typically, SMP sealant cures from a liquid or gel state to an elastic solid, wherein curing entails cross-linking of the polymer chains by the hydrolysis and cross-linking reaction of the silyl groups.

Silyl-modified polymers (SMPs) are e.g. used in the building and construction industry, aerospace, automotive, marine and other allied industries applications as both sealants and adhesives for many years. These products are typically (iso)cyanate and solvent free and exhibit good characteristics, such as adhesion on a wide range of substrate materials, excellent durability of adhesion with limited surface treatment and good temperature and UV stability Typically, the key features of SMP sealants are that they are extremely flexible and paintable.

It is known to improve the stability of SMP sealants and adhesives, in particular their weathering resistance and/or heat stability, by the addition of different stabilizers, such as antioxidants, UV stabilizers and HALS.

WO 2016/081823 describes stabilizer compositions for protecting organic materials from UV light and thermal degradation. The stabilizer compositions comprise an UV absorber selected from orthohydroxyphenyl triazine compounds, orthohydroxybenzophenone compounds, orthohydroxyphenyl benzotriazole compounds, and benzoxazinone compounds, a co-active agent (e.g. selected from $C_{12}$-$C_{60}$ alcohols, fatty acid esters and alkoxylated derivatives thereof) and a hindered amine light stabilizer (HALS).

The document US 2010/0087576 describes moisture-curable organosilicon compositions comprising an oxalanilide UV stabilizer. Furthermore, the combination of UV absorbers and hindered amine light stabilizers in silyl-modified polymer sealants is for example described in JP 2010/248408 and CN 107892900.

The document CN 106833479 discloses silane polyether sealants for automobile comprising a heat stabilizer, an UV absorber, a hindered amine light stabilizer and an antioxidant.

The document JP 2010/270241 describes silicone foams that contain a stabilizer comprising a hindered phenol antioxidant, a hindered amine light stabilizer and an UV absorber.

WO 2012/010570 teaches an additive combination for sealants (e.g. sealants based on silane terminated polyethers), wherein the additive combination comprises at least two different sterically hindered amines, for example Tinuvin® 622 and Tinuvin® 144, and an UV absorber, for example Tinuvin® 312.

Currently, a combination of a hindered amine light stabilizer and a benzotriazole type UV absorber is frequently used in the SMP sealant industry for light and heat stabilization. Often a combination of HALS bis(2,2,6,6-tetramethyl-4-piperidinyl) sebacate (CAS-No. 52829-07-9) and UV absorber 2-(2'-Hydroxy-3'-tert-butyl-5'-methylphenyl)-5-chlorobenzotriazole (CAS-No. 3896-11-5) is used to provide light and heat stabilization. Additionally, the stabilizer Tinuvin® 5866, which is a blend of an oxalanilide UV absorber and a basic HALS stabilizer, is frequently used in SMP compositions. As a disadvantage, these stabilizers are classified as hazardous according to current EU regulations for Classification, Labeling and Packaging of Chemical Substances.

There is a need to provide novel and improved stabilizer combinations for SMP sealants, which have improved heat and weathering resistance, do not cause initial yellowing, which means yellowing after mixing with the polymer (e.g. in a cartridge) before the curing step, are free of hazardous compounds, do not cause impairment of the color of the stabilized SMP compositions after thermal treatment, and finally do not impair the performance of the SMP sealants, e.g. mechanical properties, chemical resistance, adhesion, and rheological properties.

It has been surprisingly found, that a stabilizer combination, in particular a synergistic stabilizer combination, of at least one oxalanilide UV absorber, at least one selected hindered amine light stabilizer (HALS), and at least one selected phenolic antioxidant provides a significant improvement in the area of light and heat stabilization, without affecting the inherent advantageous properties of SMP sealants.

DESCRIPTION OF THE INVENTION

The present invention is directed to a stabilizer composition comprising (or preferably consisting of):

(A) an UV absorber as component A, wherein the UV absorber A is composed of one or more oxalanilide compounds according to formula (I)

(I)

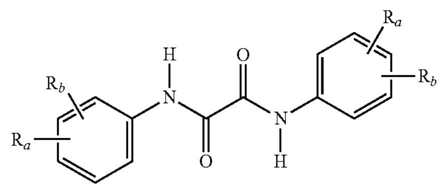

wherein $R_a$ and $R_b$ are independently of one another selected from hydrogen, alkyl groups having from 1 to 20, preferably 2 to 12, carbon atoms, alkoxy groups having from 1 to 20, preferably 2 to 12, carbon atoms and 1 to 4, preferably 1 to 2, oxygen atoms (oxygen atoms of alkoxy group(s));

(B) a hindered amine light stabilizer as component B;

(C) an antioxidant as component C, wherein the antioxidant C is composed of one or more phenolic compounds according to the formulas (III)a and/or (III)b:

(III)a

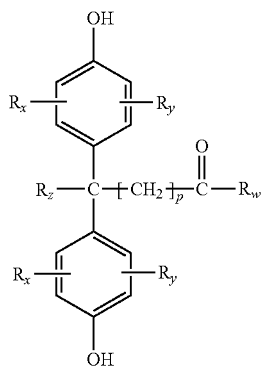

(III)b

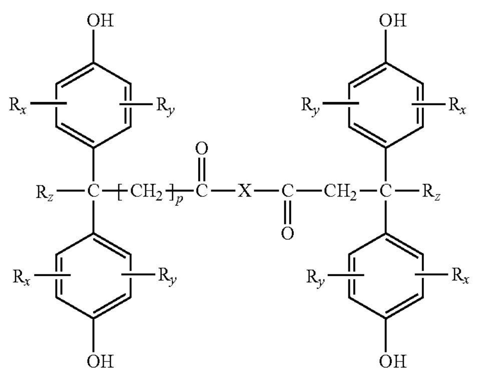

wherein $R_x$ and $R_y$ are independently of one another selected from hydrogen, halogen or an alkyl group having from 1 to 10 carbon atoms;

$R_z$ is selected from hydrogen or an alkyl group having from 1 to 10 carbon atoms;

$R_w$, is selected from a hydroxy group, an alkoxy group having from 1 to 18 carbon atoms, a phenyl alkoxy group having from 1 to 4 alkyl carbon atoms, a cycloalkoxy group having from 5 to 8 carbon atoms, or a group of formula (III)c (III)c

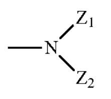

in which $Z_1$ and $Z_2$ are independently of one another selected from hydrogen, an alkyl group having from 1 to 18, a phenyl group and a cycloalkyl group having from 5 to 8 carbon atoms;

X is selected from $—O—(CH_2)_q—O—$; $—(OCH_2—CH_2)_q—O—$; $—O—(CH_2)_q—S—(CH_2)_q—O$; $—NH—(CH_2)_q—NH—$; $—NH—NH—$, with q is an integer from 1 to 12, or a group

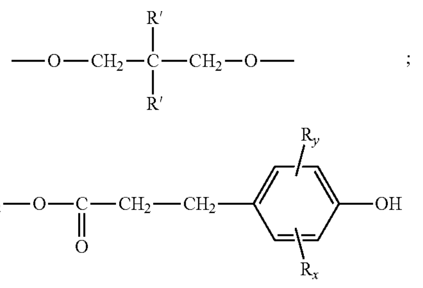

and p is zero or an integer from 1 to 6, preferably from 1 to 4;

(D) optionally at least one diluent as component D, and (E) optionally at least one further additive as component E.

The inventive stabilizer composition can advantageously be used in sealants and adhesives on the basis of silyl-modified polymers, such as silyl-modified polyethers. The stabilizer compositions result in an improved UV and heat stability and prevent initial yellowing of SMP sealants compared with standard stabilization (for example Tinuvin® 5866). Further, the inventive stabilizer compositions do not cause impairment of the color (e.g. based on CIE color system) after thermal treatment of the stabilized SMP compositions. Preferably, the mechanical properties of the stabilized SMP compositions are equal or improved.

Preferably, the inventive stabilizer composition requires no classification as hazardous according to current EU regulations for Classification, Labeling and Packaging of Chemical Substances (CLP). In particular the regulations apply as described in Regulation (EC) No 1272/2008 of the European Parliament and of the Council of 16 Dec. 2008 on classification, labelling and packaging of substances and mixtures, amending and repealing Directives 67/548/EEC and 1999/45/EC, and amending Regulation (EC) No 1907/2006.

The inventive stabilizer composition may be in form of a solid composition, in particular in powder form, wherein preferably a solid diluent D (such as calcium carbonate) might be used. Further, the inventive stabilizer composition may be in form of a liquid composition, such as a solution, dispersion, emulsion, suspension, or paste, preferably a suspension. In particular, the stabilizer composition is in a liquid form if a liquid diluent D is used and/or one or more of the components A, B, C and E are in liquid form.

For the purposes of the present invention, the term "alkyl" includes linear straight-chain or branched alkyl. Preference is given to straight-chain C1-C20 alkyl, in particular straight-chain C1-C18 alkyl, preferably straight-chain C1-C12-alkyl and branched C3-C20 alkyl, in particular branched C3-C18 alkyl, preferably branched C3-C12 alkyl. Examples of alkyl groups are, in particular, methyl, ethyl, n-propyl, isopropyl, n-butyl, isobutyl, sec-butyl, tert-butyl, n-pentyl, isopentyl, 1-methylbutyl, tert-pentyl, neopentyl, n-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, n-heptyl, n-octyl, 1-methylheptyl, 2-ethylhexyl, 2,4, 4-trimethyl-pentyl, 1,1,3,3-tetramethylbutyl, n-nonyl, n-decyl, n-undecyl, n-dodecyl, n-tridecyl, n-tetradecyl, n-pentadecyl, n-hexadecyl, n-heptadecyl, n-octadecyl and n-eicosyl.

For the purpose of the present invention, the term "alkoxy" is an alkyl group bound via an oxygen atom, wherein the carbon chain of the alkyl group can be interrupted by one or more, preferably 1 to 3, nonadjacent heteroatoms —O—. Preference is given to alkyl groups described above. Examples of alkoxy groups are, methoxy, ethoxy, n-propoxy, 1-methylethoxy, butoxy, 1-methylpropoxy, 2-methylpropoxy, 1,1-dimethylethoxy, n-pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy, hexoxy, a group $—(OC_2H_4)_u—(OC_3H_6)_v—H$ with u and v are independently from each other a number from 0 to 19, preferably 0 to 12, with the proviso that u+v are from 1 to 20, preferably 2 to 12.

Stabilizer Compositions

In a preferred embodiment the stabilizer composition comprises (or preferably consists of):

(A) 10 to 89% by weight, preferably 20 to 78% by weight, more preferably 30 to 50% by weight, based on the total stabilizer composition, of the UV absorber A;

(B) 10 to 89% by weight, preferably 20 to 78% by weight, more preferably 25 to 50% by weight, based on the total stabilizer composition, of the hindered amine light stabilizer B;

(C) 1 to 80% by weight, preferably 2 to 60% by weight, more preferably 5 to 40% by weight, based on the total stabilizer composition, of the antioxidant C;

(D) optionally 0 to 50% by weight, preferably 0 to 30% by weight, more preferably 0 to 20% by weight, based on the total stabilizer composition, of at least one diluent D;

(E) optionally 0 to 10% by weight, preferably 0 to 5% by weight, more preferably 0 to 2% by weight, based on the total stabilizer composition, of at least one further additive E.

In case that the optional components D and/or E are present the amount of the component A may be adapted in that the sum of the amounts is or does not exceed 100% by weight.

Preferably, the UV absorber A and the hindered amine light stabilizer B are present in the inventive stabilizer composition in a weight ratio of A:B in the range of 10:1 to 1:10, preferably 5:1 to 2:1, more preferably 1:1 to 1.5:1.

Preferably, the UV absorber A and the antioxidant C are present in the inventive stabilizer composition in a weight ratio of A:C in the range of 10:1 to 1:5, preferably 8:1 to 1.5:1, more preferably 5:1 to 1:1.

In a preferred embodiment the inventive stabilizer composition comprises (or preferably consists of):

(A) 20 to 79% by weight, more preferably 30 to 50% by weight, more preferably 35 to 46% by weight, based on the total stabilizer composition, of the UV absorber A;

(B) 20 to 79% by weight, more preferably 30 to 50% by weight, more preferably 35 to 46% by weight, based on the total stabilizer composition, of the hindered amine light stabilizer B;

(C) 1 to 60% by weight, preferably 5 to 40% by weight, more preferably 8 to 20% by weight, based on the total stabilizer composition, of the antioxidant C.

In another preferred embodiment the inventive stabilizer composition comprises (or preferably consists of):

(A) 20 to 69% by weight, more preferably 30 to 50% by weight, more preferably 35 to 45% by weight, based on the total stabilizer composition, of the UV absorber A;

(B) 20 to 69% by weight, more preferably 20 to 50% by weight, more preferably 25 to 35% by weight, based on the total stabilizer composition, of the hindered amine light stabilizer B;

(C) 10 to 59% by weight, preferably 10 to 40% by weight, more preferably 10 to 30% by weight, based on the total stabilizer composition, of the antioxidant C;

(D) 1 to 30% by weight, preferably 5 to 25% by weight, more preferably 10 to 20% by weight, based on the total stabilizer composition, of the at least one diluent D, preferably selected from calcium carbonate.

In another preferred embodiment the inventive stabilizer composition comprises (or preferably consists of) equal amounts of the components A, B and C.

UV Absorber (Component A)

The inventive stabilizer composition comprises an UV absorber as component A, wherein the UV absorber is composed of one or more oxalanilide compounds which is oxalanilide (N,N' diphenyloxalic acid diamide, CAS-No. 620-81-5) or derivates thereof. Preferably, the UV absorber component A does not comprise a hydroxy substituted oxalanilide compound.

Preferably, the UV absorber A is present in an amount of 10 to 89% by weight, preferably 20 to 78% by weight, more preferably 30 to 50% by weight, also preferably 35 to 46% by weight, based on the total stabilizer composition.

The UV absorber A is composed of one or more oxalanilide compounds according to formula (I)

(I)

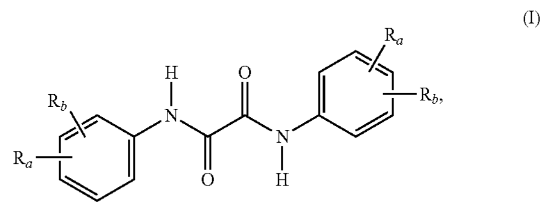

wherein $R_a$ and $R_b$ are independently of one another selected from hydrogen, alkyl groups having from 1 to 20, preferably 2 to 12, carbon atoms, alkoxy groups having from 1 to 20, preferably 2 to 12, carbon atoms and 1 to 4, preferably 1 to 2, oxygen atoms (i.e. alkoxy oxygen atoms).

The substituents $R_a$ and/or $R_b$ are preferably in the ortho and/or para-position. Preferably, one substituent $R_a$ or $R_b$ on each ring is hydrogen. Preferably, one substituent $R_a$ or $R_b$ on each ring is hydrogen and the substituents $R_a$ or $R_b$ which are not hydrogen are in ortho-position on each ring.

In a preferred embodiment one substituent $R_a$ or $R_b$ on one ring is an alkyl group having from 1 to 20, preferably 2 to 12, more preferably 2 to 4 carbon atoms, and one substituent $R_a$ or $R_b$ on the other ring is an alkoxy group having from 1 to 20, preferably 2 to 12, carbon atoms and 1 to 4, preferably 1 to 2, oxygen atoms. More preferably one substituent $R_a$ or $R_b$ on one ring is methyl, ethyl or propyl, more preferably ethyl, and one substituent $R_a$ or $R_b$ on the other ring is a $C_2$-$C_4$ alkoxy group, more preferably $—OCH_2CH_3$.

The preferred UV absorber A is composed of one or more oxalanilide compounds selected from compounds of the following formulas (I)-1 to (I)-7:

(I)-1

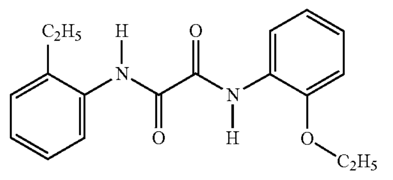

(I)-2

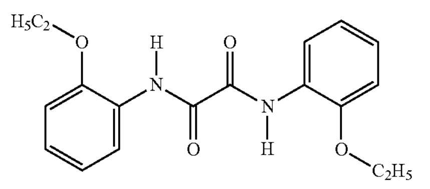

(I)-3

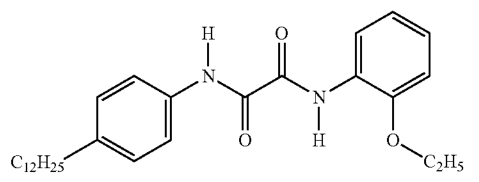

(I)-4

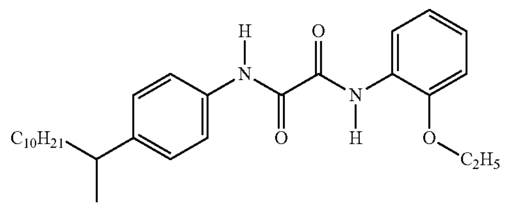

(I)-5

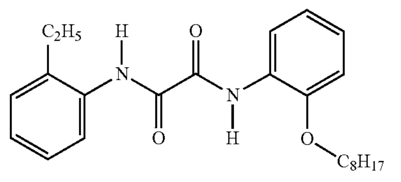

(I)-6

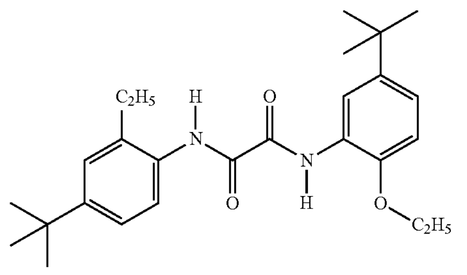

-continued (I)-7

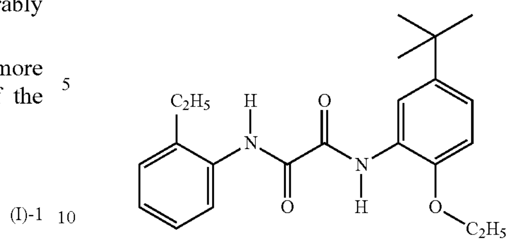

In a preferred embodiment the UV absorber A is composed of one of the oxalanilide compounds mentioned above.

Preferably, the UV absorber A comprises (or is composed of) the oxalanilide compound according to formula (I)-1 (N-(2-ethoxyphenyl)-N'-(2-ethylphenyl)-ethylene diamide; 2-Ethyl-2'-ethoxy-oxalanilide, CAS-No. 23949-66-8) as mentioned above.

Preferred embodiments of the UV absorber component A are described in U.S. Pat. No. 5,969,014 and/or U.S. Pat. No. 6,916,867.

Hindered Amine Light Stabilizer (Component B)

The inventive stabilizer composition comprises a hindered amine light stabilizer (HALS) as component B. Preferably, the hindered amine light stabilizer is composed of one or more compounds including a tetramethylpiperidinyl group according to formula (II):

(II)

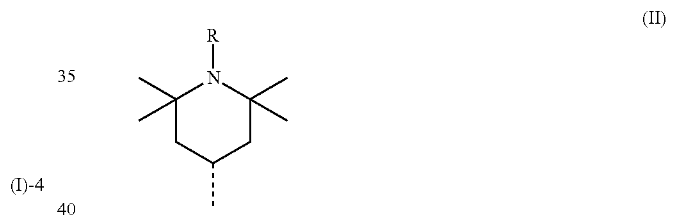

with R is selected from hydrogen, alkyl groups having from 1 to 20, preferably 2 to 12, carbon atoms, alkoxy groups having from 1 to 20, preferably 2 to 12, carbon atoms and 1 to 4, preferably 1 to 2, oxygen atoms (i.e. alkoxy oxygen atoms).

Preferably, the hindered amine light stabilizer (HALS), used as component B, does not require a classification as hazardous according to current EU regulations for Classification, Labelling and Packaging of Chemical Substances (CLP).

Examples of suitable hindered amine light stabilizer are 2-dodecyl-N-(2,2,6,6-tetramethyl-4-piperidinyl)succinimide (CAS-No 79720-19-7); bis(2,2,6,6-tetramethyl-4-piperidinyl)sebacate (CAS-No 52829-07-9); bis(1,2,2,6,6-pentamethyl-4-piperidinyl)sebacat (CAS-No 41556-26-7); bis (1-octyloxy-2,2,6,6-tetramethyl-4-piperidinyl)sebacat (CAS-No 129757-67-1); 2,2,4,4-tetramethyl-7-oxa-3,20-diazadispiro-20-(2,3-epoxi-propyl)dispiro-(5.1.11.2)-heneicosane-21-one (CAS-No. 64338-16-5); reaction product of 2,2,4,4-tetramethyl-7-oxa-3,20-diazadispiro-20-(2,3-epoxi-propyl)dispiro-(5.1.11.2)-heneicosane-21-one and epichlorohydrin (Hostavin® N30) and mixtures thereof.

In a preferred embodiment the hindered amine light stabilizer B is an oligomeric hindered amine light stabilizer. More preferably the hindered amine light stabilizer is an oligomeric hindered amine light stabilizer composed of a mixture of oxadiaza-spirodecane compounds according to formulas (II)a and (II)b and optionally (II)c as defined below.

In a preferred embodiment the hindered amine light stabilizer B is composed of 65 to 95% by weight, preferably 75 to 94% by weight, more preferably 85 to 95% by weight, based on component B, of at least one compound of formula (II)a, 5 to 35% by weight, preferably 5 to 20% by weight, more preferably 5 to 12% by weight, based on component B, of at least one compound of formula (II)b, and 0 to 10% by weight, preferably 1 to 5% by weight, more preferably 1 to 3% by weight, based on component B, of at least one compound of formula (II)c:

(II)a

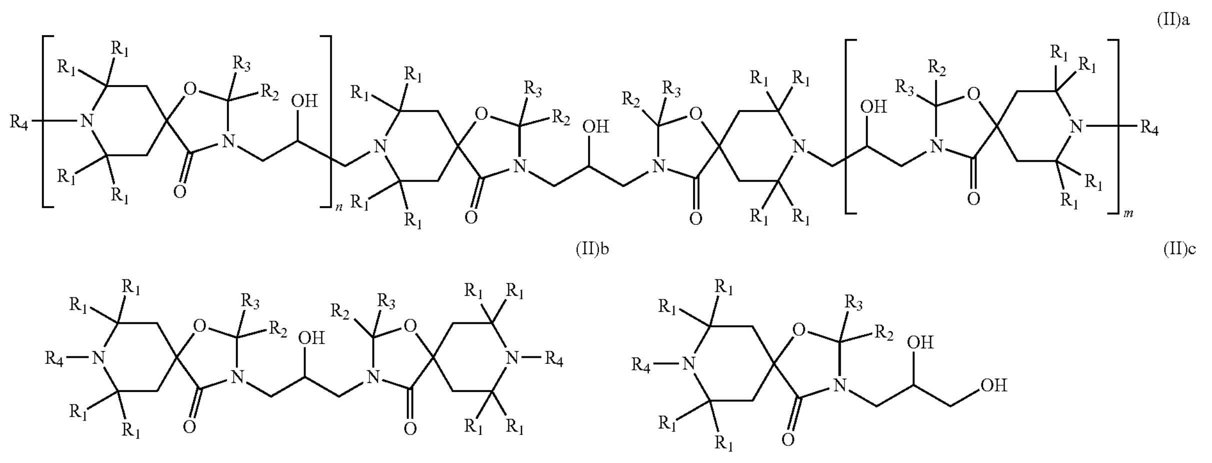

(II)b (II)c n and m are independently of one another a number from 0 to 100, preferably 0 to 10, more preferably 0 to 5, with the proviso that n and m are not both 0;

$R_1$ is hydrogen, a cycloalkyl group having from 5 to 7 carbon atoms, or an alkyl group having from 1 to 12 carbon atoms;

$R_2$ and $R_3$ are independently of one another selected from hydrogen, an alkyl group having from 1 to 18 carbon atoms, or are, together with the carbon atom connecting them, a 5- to 13-membered cycloalkyl ring, or are, together with the carbon atom connecting them, a group of formula (II)d (II)d

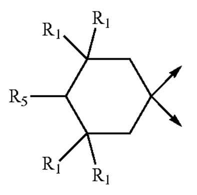

in which is $R_1$ as defined above; and $R_4$ and $R_5$ are independently of one another selected from hydrogen, an alkyl group having from 1 to 22 carbon atoms, an oxygen radical 0*, —OH, —NO, —$CH_2$CN, benzyl, allyl, an alkyloxy group having from 1 to 30 carbon atoms, a cycloalkyloxy group having from 5 to 12 carbon atoms, a aryloxy group having from 6 to 10 carbon atoms in which additionally the aryl radical may be substituted, a arylalkyloxy group having from 7 to 20 carbon atoms in which additionally the aryl radical may be substituted, an alkenyl group having from 3 to 10 carbon atoms, an alkynyl group having from 3 to 6 carbon atoms, an acyl group having from 1 to 10 carbon atoms, halogen, unsubstituted phenyl or $C_1$-$C_4$-alkyl-substituted phenyl.

Preferably, the hindered amine light stabilizer B is present in an amount of 10 to 89% by weight, preferably 20 to 78% by weight, more preferably 25 to 50% by weight, also preferably 25 to 46% by weight, based on the total stabilizer composition.

Preferably, the inventive stabilizer composition comprises a hindered amine light stabilizer B composed of 65 to 95% by weight, preferably 75 to 94% by weight, more preferably 85 to 95% by weight, based on component B, of at least one compound of formula (II)a, 5 to 35% by weight, preferably 5 to 20 by weight, more preferably 5 to 12% by weight, based on component B, of at least one compound of formula (II)b, and 0 to 10% by weight, preferably 1 to 5% by weight, more preferably 1 to 3% by weight, based on component B, of at least one compound of formula (II)c as shown above; wherein n and m are independently of one another a number from 0 to 100, preferably 0 to 10, more preferably 0 to 5, with the proviso that n and m are not both 0;

$R_1$ is hydrogen, a cycloalkyl group having from 5 to 7, preferably 6, carbon atoms, or an alkyl group having from 1 to 12, preferably 1 to 6, carbon atoms;

$R_2$ and $R_3$ are independently of one another selected from hydrogen, an alkyl group having from 1 to 18 carbon atoms, or are, together with the carbon atom connecting them, a 5- to 13-membered cycloalkyl ring, or are, together with the carbon atom connecting them, a group of formula (II)d as defined above; and $R_4$ and $R_5$ are independently of one another selected from hydrogen, an alkyl group having from 1 to 22 carbon atoms, an oxygen radical 0*, —OH, —NO, —$CH_2$CN, benzyl, allyl, an alkyloxy group having from 1 to 30 carbon atoms, a cycloalkyloxy group having from 5 to 12 carbon atoms, a aryloxy group having from 6 to 10 carbon atoms in which additionally the aryl radical may be substituted, a arylalkyloxy group having from 7 to 20 carbon atoms in which additionally the aryl radical may be substituted, an alkenyl group having from 3 to 10 carbon atoms, an alkynyl group having from 3 to 6 carbon atoms, an acyl group having from 1 to 10 carbon atoms, halogen, unsubstituted phenyl or $C_1$-$C_4$-alkyl-substituted phenyl.

In a preferred embodiment the HALS component B as described above is the only hindered amine light stabilizer included in the inventive stabilizer composition.

Preferred embodiments of the stabilizer component B, which is a mixture of the compounds according to formula (II)a, (II)b, and optionally (II)c, are for example described in U.S. Pat. No. 6,174,940 and/or US 2005/0228086. The substituents $R_1$ to $R_5$ of formulas (II)a to (II)d and indices n and m refer to the corresponding substituents and indices defined in U.S. Pat. No. 6,174,940.

Preferably, the HALS component B is composed of the compounds according to formulas (II)a and (II)b and optionally (II)c, wherein the substituents $R_1$ to $R_5$ have the same definitions.

Preferably, the HALS component B is composed of the compounds according to formulas (II)a and (II)b and optionally (II)c, wherein n and m are independently of one another a number from 0 to 10, more preferably 0 to 5, with the proviso that n and m are not both 0;

$R_1$ is hydrogen, a cycloalkyl group having 6 carbon atoms, or an alkyl group having from 1 to 4 carbon atoms;

$R_2$ and $R_3$ are independently of one another selected from hydrogen, an alkyl group having from 1 to 6 carbon atoms, or are, together with the carbon atom connecting them, a 6- to 12-membered cycloalkyl ring, or are, together with the carbon atom connecting them, a group of formula (II)d; and $R_4$ and $R_5$ are independently of one another selected from hydrogen, an alkyl group having from 1 to 5 carbon atoms, an oxygen radical 0*, —OH, —NO, —$CH_2CN$, benzyl, allyl, an alkyloxy group having from 1 to 10 carbon atoms, a cycloalkyloxy group having from 5 to 6 carbon atoms, a aryloxy group having from 6 to 7 carbon atoms in which additionally the aryl radical may be substituted, a arylalkyloxy group having from 7 to 10 carbon atoms in which additionally the aryl radical may be substituted, an alkenyl group having from 3 to 6 carbon atoms, an alkynyl group having from 3 to 6 carbon atoms, an acyl group having from 1 to 4 carbon atoms, halogen, unsubstituted phenyl or $C_1$-$C_2$-alkyl-substituted phenyl.

More preferably, the HALS component B is composed of compounds according to formulas (II)a and (II)b and optionally (II)c, wherein n and m are independently of one another a number from 0 to 5, with the proviso that n and m are not both 0;

$R_1$ is an alkyl group having from 1 to 4 carbon atoms, more preferably methyl;

$R_2$ and $R_3$ are, together with the carbon atom connecting, them a 6- to 12-membered cycloalkyl ring, preferably a 12 membered cycloalkyl ring, or are, together with the carbon atom connecting them, a group of formula (II)d;

$R_4$ and $R_5$ are independently of one another selected from hydrogen, an alkyl group having from 1 to 4 carbon atoms, an alkyloxy group having from 1 to 6 carbon atoms, a cycloalkyloxy group having from 5 to 6 carbon atoms, and an acyl group having from 1 to 4 carbon atoms.

Preferably, the substituents $R_1$ in formulas (II)a to (II)d are independently from each other hydrogen or an alkyl group having from 1 to 4 carbon atoms, more preferably all substituents $R_1$ are methyl.

Preferably, the substituents $R_2$ and $R_3$ in formulas (II)a to (II)c are, together with the carbon atom connecting them, a 12 membered cycloalkyl ring.

Preferably, the substituents $R_4$ and $R_5$ in formulas (II)a to (II)d are independently of one another selected from hydrogen, methyl, acetyl, octyloxy or cyclohexyloxy.

In a preferred embodiment the HALS component B is composed of the compounds according to formulas (II)a and (II)b and optionally (II)c, wherein n and m are independently of one another a number from 0 to 10, more preferably 0 to 5, with the proviso that n and m are not both 0; $R_1$ is methyl;

$R_2$ and $R_3$ are, together with the carbon atom connecting, them a 12 membered cycloalkyl ring, and $R_4$ is hydrogen.

In a more preferred embodiment the hindered amine light stabilizer B is composed of 85 to 95% by weight, based on component B, of at least one compound of formula (II)a, 5 to 12% by weight, based on component B, of at least one compound of formula (II)b, and 1 to 3% by weight, based on component B, of at least one compound of formula (II)c, wherein n and m are independently of one another a number from 0 to 10, more preferably 0 to 5, with the proviso that n and m are not both 0;

$R_1$ is methyl;

$R_2$ and $R_3$ are, together with the carbon atom connecting, them a 12 membered cycloalkyl ring, and $R_4$ is hydrogen.

Typically, the HALS component B has a (weight average) molecular weight of more than 1.500 g/mol.

The stabilizer component B, which is a mixture of oxa-diaza-spirodecane compounds according to formulas (II)a and (II)b and optionally (II)c as defined above, is preferably obtained by reacting a polyalkyl-1-oxadiazaspirodecan with an epihalogenohydrin, in particular epichlorhydrin. The preparation of suitable stabilizers B is for example described in U.S. Pat. No. 4,340,534 and/or US 2005/228086.

In particular the mixture of the oxadiaza-spirodecane compounds according to (II)a, (II)b and (II)c is obtained by reacting compounds of general formula (II)e (II)e

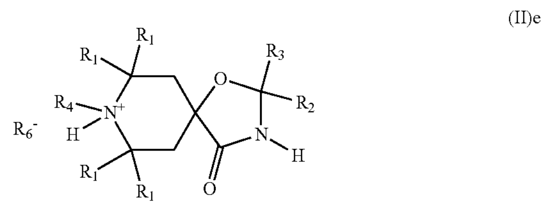

wherein the radicals $R_1$, $R_2$, $R_3$ and $R_4$ are as defined above, and $R_6$ is the anion of a protic acid of main group (V), (VI) or (VII) element, in particular a chloride anion;

with an epihalogenohydrin of the formula (II)f:

(II)f

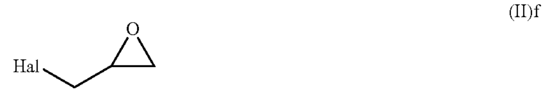

wherein Hal is halogen, being understood as meaning a chlorine, bromine or iodine atom, preferably chlorine.

Typically, in a first step a compound of formula (II)c is build, subsequent heating of the reaction mixture leads to the formation of the compounds of formulas (II)a and (II)b. Preferably, the compounds (II)e and (II)f are reacted in a molar ratio of from 1:1 to 1:2.9; preferably from 1:1 to 1:2.7 and in particular from 1:2 to 1:2.5. In particular, the reaction takes place in an inert organic solvent in the presence of from four to twenty times the molar amount of alkali metal hydroxide relative to compounds of the formula (II)e. Typically, the reaction temperature lies in the range from 20 to 220° C., preferably from 40 to 120° C., and in particular from 60 to 90° C.

Preferred inert organic solvents are aliphatic or aromatic hydrocarbons, such as petroleum ether, hexane, heptane, petroleum fractions, toluene, cyclohexane, mesitylene or xylene, for example. Particular preference is given to aromatic hydrocarbons, especially xylene. The inert organic solvent is preferably used in a weight ratio of from 2:1 to 1:5, more preferably from 2:1 to 1:3 and in particular from 2:1 to 1:2, relative to the compound (II)e.

Typically, a phase transfer catalyst is used in the reaction. For example phase transfer catalysts used are polyethylene glycols, preferably polyethylene glycols with an average degree of oligomerization, and in particular polyethylene glycol 200, in a quantitative proportion of from 1.5 to 10% by weight, preferably from 3 to 7% by weight and in particular 4 to 6% by weight, relative to the amount of the compound of the formula (II)e. For example, phase transfer catalysts used can be quaternary ammonium halides, such as tricaprylmethylammonium chloride, in particular in quantitative proportion of from 0.1 to 5% by weight, relative to the compound (II)e.

The reaction of compounds (II)e and (II)f is generally over after from 30 to 60 minutes. Following the reaction, the excess of the epihalohydrin is removed from the reaction mixture, preferably by distillation. The organic and aqueous phases are separated; the organic phase is washed with water and the inert organic solvent is removed, preferably by distillation. The mixture obtained can be converted without a further purification step, by heating at from 100 to 240° C., preferably from 120 to 220° C. and in particular from 150 to 200° C., preferably under reduced pressure, into the desired mixture of the formulae (II)a, (II)b and (II)c.

By varying the amounts of the compounds of the formula (II)e used, the amount of epihalohydrin (II)f, the amount of alkali metal hydroxide used and the amount of phase transfer catalyst employed, it is possible to adjust the composition of the mixture of components (II)a, (II)b and (II)c. The composition of the mixture of components (II)a, (II)b and (II)c can be shown by conventional spectroscopic methods (IR and $^{13}$C-NMR spectroscopy).

In a particular preferred embodiment the HALS component B comprises (or preferably consists of) the reaction product of 2,2,4,4-tetramethyl-7-oxa-3,20-diazadispiro-20-(2,3-epoxi-propyl)dispiro-(5.1.11.2)-heneicosane-21-one and epichlorohydrin. Said reaction product is typically obtained as described above. Preferably said reaction product is obtained by reacting 2,2,4,4-tetramethyl-7-oxa-3,20-diazadispiro-20-(2,3-epoxi-propyl)dispiro-(5.1.11.2)-heneicosane-21-one and epichlorohydrin in a molar ratio of 1:2 to 1:2.5 in the presence of from four to twenty times the molar amount of alkali metal hydroxide relative to the molar amount of 2,2,4,4-tetramethyl-7-oxa-3,20-diazadispiro-20-(2,3-epoxi-propyl)dispiro-(5.1.11.2)-heneicosane-21-one, in an organic solvent using a phase transfer catalyst.

Phenolic Antioxidant (Component C)

It was surprisingly found that the addition of a phenolic antioxidant in combination with the UV absorber A and the hindered amine light stabilizer B results in synergistic improvement of the stabilizer combination, in particular in view of heat stability, UV/weathering resistance and color.

Preferably, the antioxidant C is present in an amount of 1 to 80% by weight, preferably 2 to 60% by weight, more preferably 5 to 40% by weight, also preferably 8 to 20% by weight, based on the total stabilizer composition.

The inventive stabilizer composition comprises an antioxidant as component C, wherein the antioxidant is composed of one or more phenolic compounds according to the formulas (III)a and/or (III)b as shown above, wherein $R_x$ and $R_y$ are independently of one another selected from hydrogen, halogen or an alkyl group having from 1 to 10, preferably 1 to 6, more preferably 1 to 4, carbon atoms;

$R_z$ is selected from hydrogen or an alkyl group having from 1 to 10, preferably 1 to 6, more preferably 1 to 4, carbon atoms;

$R_w$ is selected from a hydroxy group, an alkoxy group having from 1 to 18 carbon atoms, a phenyl alkoxy group having from 1 to 4 alkyl carbon atoms, a cycloalkoxy group having from 5 to 8 carbon atoms, or a group of formula (III)c (III)c

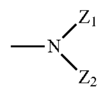

in which $Z_1$ and $Z_2$ are independently of one another selected from hydrogen, an alkyl group having from 1 to 18, preferably 1 to 10, carbon atoms, a phenyl group and a cycloalkyl group having from 5 to 8 carbon atoms;

X is selected from $—O—(CH_2)_q—O—$; $—(OCH_2—CH_2)_q—O—$; $—O—(CH_2)_q—S—(CH_2)_q—O$; $—NH—(CH_2)_q—NH—$; $—NH—NH—$, with q is an integer from 1 to 12, preferably 1 to 6, or a group

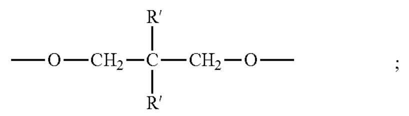

;

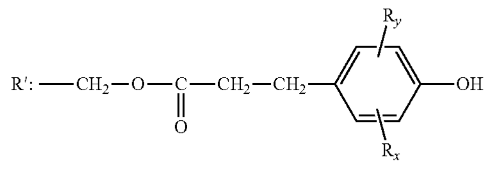

and p is zero or an integer from 1 to 6, preferably from 1 to 4.

In a preferred embodiment the phenolic antioxidant compounds C, used in the inventive stabilizer composition, does not include an amine group.

Preferably $R_x$ and $R_y$ are independently of one another selected from a branched alkyl group having from 1 to 10, preferably 1 to 6, more preferably 1 to 4, carbon atoms. More preferably one or both of $R_x$ and $R_y$ are a tert-butyl group.

Preferably X is a group from —O—$(CH_2)_q$—O—, with q is an integer from 1 to 12, preferably 2 to 6, more preferably 2 to 4.

In a preferred embodiment the antioxidant C is composed of one or more phenolic compounds according to the formulas (III)a' and/or (III)b':

(III)a'

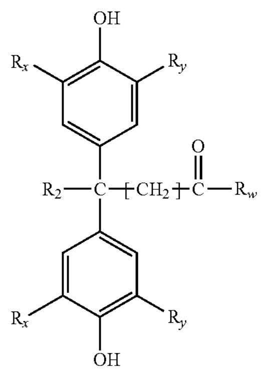

(III)b'

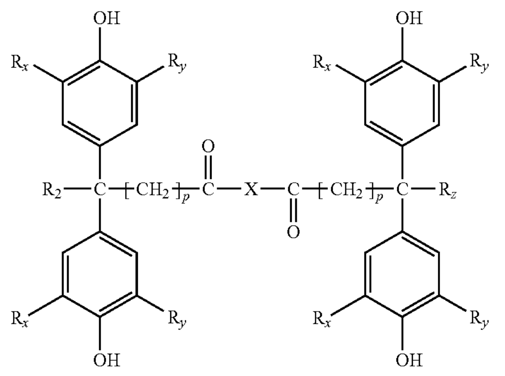

wherein the substituents and indices are as described above for formulas (III)a and (III)b.

In a preferred embodiment the antioxidant C comprises (or preferably consists of) a phenolic compound according to formula (III)b, or preferably (III)b', wherein

- $R_x$ and $R_y$ are independently of one another selected from a branched alkyl group having from 1 to 6, more preferably 1 to 4, carbon atoms, more preferably one or both of $R_x$ and $R_y$ are a tert-butyl group;
- $R_z$ is selected from hydrogen or an alkyl group having from 1 to 4 carbon atoms;
- X is —O—$(CH_2)_q$—O— with q is an integer from 2 to 4; and
- p is an integer from 1 to 4.

In a preferred embodiment the antioxidant C comprises (or preferably consists of) bis-(3,3-bis-(4'-hydroxy-3'-tert-butyl-phenyl)butanoic acid)-glycolester (CAS-No. 32509-66-3).

In a preferred embodiment the antioxidant C comprises (or preferably consists of) a phenolic compound according to formula (III)-1; bis-(3,3-bis-(4'-hydroxy-3'-tert-butyl-phenyl)butanoic acid)-glycolester (CAS-No. 32509-66-3).

(III)-1

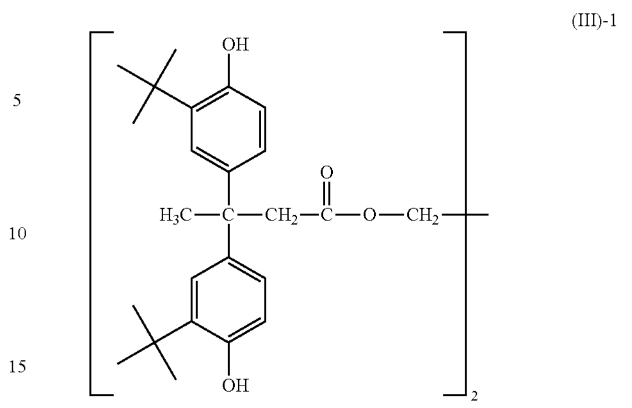

Preferred embodiments of the antioxidant component C are also described in U.S. Pat. No. 6,270,692 and/or GB 1 440 391.

In a preferred embodiment of the inventive stabilizer composition the UV absorber A comprises (or preferably consists of) the oxalanilide compound according to formula (I)-1, and the antioxidant C comprises (or preferably consists of) the phenolic compound bis-(3,3-bis-(4'-hydroxy-3'-tert-butyl-phenyl)butanoic acid)-glycolester.

In a more preferred embodiment of the inventive stabilizer composition the UV absorber A comprises (or preferably consists of) the oxalanilide compound according to formula (I)-1, the hindered amine light stabilizer B comprises (or preferably consists of) the reaction product of 2,2,4,4-tetramethyl-7-oxa-3,20-diazadispiro-20-(2,3-epoxipropyl)dispiro-(5.1.11.2)-heneicosane-21-one and epichlorohydrin, and the antioxidant C comprises (or preferably consists of) the phenolic compound bis-(3,3-bis-(4'-hydroxy-3'-tert-butyl-phenyl)butanoic acid)-glycolester.

Diluent (Component D)

The inventive stabilizer composition may comprise one or more diluents D as an optional component. Preferably, the at least one diluent D is present in an amount of from 0 to 50% by weight, preferably 0 to 30% by weight, more preferably 0 to 20% by weight, also preferably 5 to 25% by weight, also preferably 10 to 20% by weight, based on the total stabilizer composition.

Preferably, the diluent D can be selected from solid inorganic powders, such as talc, mica, dolomite, kaolin, silica, calcium carbonate, magnesium carbonate, titanium oxide, iron oxide, zinc oxide, carbon black, or from suitable liquid diluents, such as suitable solvents or liquid plasticizers. Preferably, the at least one diluent D is calcium carbonate, in particular one or more calcium carbonate selected from chalk, marble, limestone, precipitated calcium carbonate (PCC), coated precipitated calcium carbonate, ground calcium carbonate (GCC) (in particular GCC based on chalk, marble and/or limestone) and coated ground calcium carbonate. For example PCC and/or GCC coated with fatty acids can be used as diluent D.

In a preferred embodiment the stabilizer composition comprises 1 to 30% by weight, preferably 5 to 25% by weight, more preferably 10 to 20% by weight, based on the total stabilizer composition, of at least one diluent D, selected from kaolin, silica, calcium carbonate, magnesium carbonate, and titanium oxide, more preferably calcium carbonate, as diluent D.

Further Additive (Component E)

The inventive stabilizer composition may comprise one or more further additives E as an optional component, such as common additives for stabilizer composition and SMP sealants and adhesives.

Preferably, the optional at least one additive E is present in an amount of from 0 to 10% by weight, preferably 0 to 5% by weight, more preferably 0 to 2% by weight, also preferably 0.01 to 10% by weight, also preferably 0.1 to 1% by weight, based on the total stabilizer composition.

The further additive E can be selected from common additives, such as antistatic agents, flame proofing agents, softeners, nucleating agents, metal deactivators, biocides, impact modifiers, pigments and fungicides, bactericides. Further, one or more additives mentioned as additives G below might be used in the inventive stabilizer composition.

Process for Preparing the Stabilizer Composition

The present invention is also directed to a process for preparing the inventive stabilizer composition, wherein the components A, B, C and optionally D and/or E are mixed. In particular the mixing can be carried out by mixing the components A, B, C and optionally D and/or E in dry solid form, in particular in powder form.

Preferably, the process for preparing the inventive stabilizer composition may encompass a step of milling one or more of the components A, B, C and optionally D and/or E. Preferably, the stabilizer composition can be obtained, e.g. by a milling step (e.g. micronisation), in form of a solid having a particle size $d_{50}$ in the range of 10 to 1000 μm.

In a further embodiment the process for preparing the stabilizer composition may encompass a step of dispersing at least one solid component, selected from components A, B and/or C, in a liquid, wherein the liquid may be a liquid diluent D and/or one or more of the components A, B, C or E in liquid form.

Further the invention is directed to the use of the inventive stabilizer composition as stabilizer in sealants or adhesives based on silyl-modified polymers. In particular the inventive stabilizer composition is used to improve UV and heat stability of sealants or adhesives based on silyl-modified polymers, i.e. resistance against decrease of mechanical and/or optical surface properties under exposure to UV radiation and/or heat.

Polymer Composition

Furthermore, the present invention is directed to a polymer composition based on a silyl-modified polymer (SMP) comprising the described stabilizer combination of UV absorber A, hindered amine light stabilizer B and phenolic antioxidant C as described above. The present invention is directed to a polymer composition comprising (P) at least one polymer P selected from silyl-modified polymers;

(S) a stabilizer combination S composed of an UV absorber A;

an hindered amine light stabilizer B; and an antioxidant C;

wherein the components A, B and C are as defined for the inventive stabilizer composition;

(F) optionally at least one filler F;

(G) optionally at least one further additive G, preferably selected from plasticizers G1, adhesion promoters G2, catalysts G3 and moisture scavengers G4.

In a preferred embodiment the invention is directed to a polymer composition comprising (or preferably consisting of):

(P) 5 to 99% by weight, preferably 10 to 80% by weight, more preferably 15 to 40% by weight, based on the total polymer composition, of the at least one polymer P selected from silyl-modified polymers;

(S) a stabilizer combination S composed of 0.001 to 3% by weight, preferably 0.01 to 1% by weight, more preferably 0.1 to 0.8% by weight, based on the total polymer composition, of the UV absorber A;

0.001 to 3% by weight, preferably 0.01 to 1% by weight, more preferably 0.1 to 0.8% by weight, based on the total polymer composition, of the hindered amine light stabilizer B; and 0.001 to 3% by weight, preferably 0.01 to 1% by weight, more preferably 0.05 to 0.3% by weight, based on the total polymer composition, of the antioxidant C;

(F) optionally 0 to 85% by weight, preferably 0 to 80% by weight, more preferably from 1 to 70% by weight, based on the total polymer composition, of at least one filler F, preferably selected from calcium carbonate;

(G) optionally 0 to 35% by weight, preferably 0 to 33% by weight, more preferably from 1 to 30% by weight, based on the total polymer composition, of at least one further additive G, preferably selected from plasticizers G1, adhesion promoters G2, catalysts G3 and moisture scavengers G4.

In case that the optional components F and/or G are present the amount of the component P may be adapted in that the sum of the amounts is or does not exceed 100% by weight.

The preferred embodiments of the components A, B and C as described above applies to the inventive polymer composition as well.

In a preferred embodiment the polymer composition comprises (or preferably consists of):

(P) 7.5 to 95% by weight, preferably 12.5 to 72% by weight, more preferably 17 to 57% by weight, based on the total polymer composition, of the at least one polymer P selected from silyl-modified polymers;

(S) a stabilizer combination S composed of 0.001 to 3% by weight, preferably 0.01 to 1% by weight, more preferably 0.1 to 0.8% by weight, based on the total polymer composition, of the UV absorber A;

0.001 to 3% by weight, preferably 0.01 to 1% by weight, more preferably 0.1 to 0.8% by weight, based on the total polymer composition, of the hindered amine light stabilizer B; and 0.001 to 3% by weight, preferably 0.01 to 1% by weight, more preferably 0.05 to 0.3% by weight, based on the total polymer composition, of the antioxidant C;

(F) 1 to 90% by weight, preferably 20 to 80% by weight, more preferably 30 to 70% by weight, based on the total polymer composition, of at least one filler F;

(G1) 1 to 25% by weight, preferably 5 to 25% by weight, more preferably from 10 to 20% by weight, based on the total polymer composition, of at least one plasticizer as further additive G1;

(G2) 0.5 to 5% by weight, preferably 0.8 to 3% by weight, more preferably from 1 to 2% by weight, based on the total polymer composition, of at least one adhesion promoter as further additive G2;

(G3) 0.01 to 3% by weight, preferably 0.1 to 2% by weight, more preferably from 0.2 to 1% by weight, based on the total polymer composition, of at least one catalyst as further additive G3;

(G4) 0.5 to 5% by weight, preferably 1.2 to 5% by weight, more preferably from 1.5 to 3% by weight, based on the total polymer composition, of at least one moisture scavenger as further additive G4;

(G) and optionally 0 to 10% by weight, based on the total polymer composition, of at least one further additive G different from G1 to G4.

In a preferred embodiment the components P, S, F and G sum up to 100% by weight, wherein in particular the amount of the components P and/or F can be adapted.

In particular the inventive polymer composition can be obtained using an inventive stabilizer composition as described above. In particular the polymer composition comprises from 0.01 to 5% by weight, preferably 0.1 to 3% by weight, more preferably 0.2 to 1% by weight, based on the total polymer composition, of the inventive stabilizer composition.

Silyl-Modified Polymer P

Typically, the silyl-modified polymer P is selected from organic polymers, in particular based on polyethers, polyurethanes, and/or acrylic polymers, having at least one, preferably two terminal, cross-linkable hydrolysable silyl group. Preferably, the terminal cross-linkable hydrolysable silyl groups are the only cross-linkable hydrolysable silyl group in the silyl-modified polymer P.

For example suitable silyl-modified polymers P are the commercial products Kaneka MS Polymers® (such as MS Polymer S203H, MS Polymer 5303H) or Polymer ST from Evonik, which are silyl-modified polymers including polyether and polyurethane blocks, or polymers available from The Dow Chemical Company under the tradename VORASIL®, which are silyl-modified polymers having a polyurethane polymer backbone.

The polymerization methods for preparing silyl-modified polymers are commonly known in the art and for example described in U.S. Pat. No. 3,971,751 and EP-A 1 288 247.

In particular the cross-linkable hydrolysable silyl group can be described by the following formula (P-I):

(P-I)

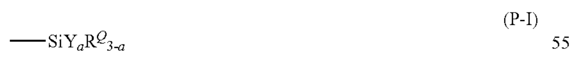

wherein $R^Q$ is selected from an alkyl group having from 1 to 20 carbon atoms, an aryl group having from 6 to 20 carbon atoms and an aralkyl group having from 7 to 20 carbon atoms, Y is a hydroxyl group or a hydrolysable group;

a is 1, 2 or 3, and if two or more groups $R^Q$ or Y are present, they may be the same or different.

For example the hydrolysable group Y can be selected from hydrogen, a halogen atom, an alkoxy group having from 1 to 20 carbon atoms, preferably a methoxy group or a ethoxy group, an acyl oxide group, a ketoxime group, an amino group, an amide group, an acid amide group, an aminooxy group, a mercapto group. Preferably, the hydrolysable group Y is selected from alkoxy groups, in particular methoxy and ethoxy.

The at least one silyl-modified polymer P may comprise one or more silyl-modified polyurethanes and/or silyl-modified polyurethane/polyether copolymers comprising at least one cross-linkable hydrolysable silyl group. In particular the silyl-modified urethane polymer may for example be derived from the reaction of an aromatic polyisocyanate, such as toluene diisocyanate, diphenylmethane diisocyanate or xylylene diisocyanate or an aliphatic polyisocyanate (e.g. isophorone diisocyanate or hexamethylene diisocyanate) with a polyol.

In a preferred embodiment the at least one silyl-modified polymer P comprises (or preferably consist of) at least silyl-modified polyether. Typically, silyl-modified polyethers encompass a polyether main chain modified by at least one cross-linkable hydrolysable silyl group, more preferably by two terminal cross-linkable hydrolysable silyl groups. For example the polyether main chain may include repeating units selected from polyethylene oxide, polypropylene oxide, polybutylene oxide and/or polyphenyleneoxide. Further, the polyether may contain a urethane bond or urea bond in the main chain. Preferably the silyl-modified polyether comprises polyethylene oxide repeating units in the polyether main chain, wherein preferably at least 50% by weight, preferably at least 70% by weight, more preferably at least 90% by weight, of the repeating units are polyethylene oxide repeating units. Preferred silyl-modified polyethers having two terminal cross-linkable hydrolysable silyl groups are for example described in U.S. Pat. No. 3,971,751 and US 2002/198308.

In a preferred embodiment the silyl-modified polymer P is selected from silyl-modified polyethers according to the following formula (P-II):

(P-II)

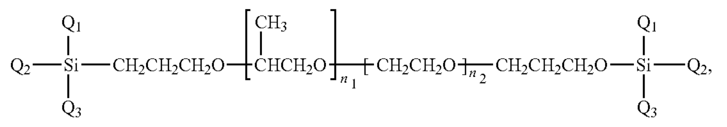

wherein $Q_1$, $Q_2$ and $Q_3$ are independently from each other selected from an alkyl group having 1 to 40, preferably 1 to 20, more preferably 1 to 4, carbon atoms, an alkyloxy group having from 1 to 10, preferably 1 to 4 carbon atoms, such as methoxy or ethyoxy, and acetyloxy, with the proviso that at least one of $Q_1$, $Q_2$ and $Q_3$ is a cross-linkable hydrolysable silyl group, preferably selected from methoxy, ethoxy, and acetyloxy, and $n_1$ and $n_2$ are independently from each other a integer from 0 to 1000, preferably 0 to 500, more preferably 0 to 300, with the proviso that $n_1+n_2$ is at least 50, preferably at least 100.

In a more preferred embodiment the silyl-modified polymer P is selected from silyl-modified polyethers according to the following formulas (P-III) and (P-IV):

(P-III)

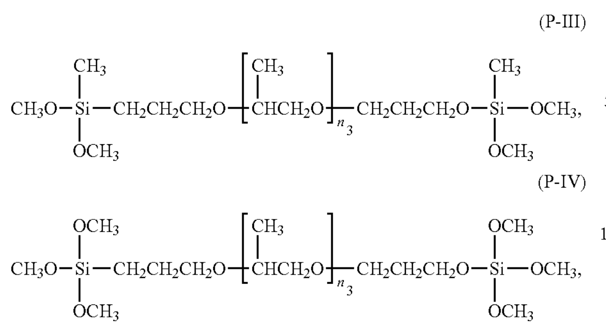

(P-IV)

wherein $n_3$ is an integer from 5 to 1000, preferably 10 to 500, more preferably 20 to 500, also preferably 50 to 300.

Preferably, the molecular weight of the polyether main chain of the silyl modified polyether, e.g. as described in formulas (P-I) to (P-III), is in the range of 500 to 30,000 g/mol, preferably 1,000 to 15,000 g/mol, more preferably 3,000 to 12,000 g/mol.

Preferably, one or more di-methoxysilyl terminated polyether (DMS MS) and/or trimethoxysilyl terminated polyether (TMS MS) are used as silyl-modified polymer P. More preferably one or more di-methoxysilyl terminated polyether (DMS MS) is used as polymer P. More particular a methyl di-methoxysilyl terminated polyether is used.

Typically, the silyl-modified polyethers, preferably having two terminal cross-linkable hydrolysable silyl group, used as polymer P has a molecular weight (in particular a number average molecular weight) in the range of from about 1,000 to 50,000 g/mol, preferably about 5,000 to about 40,000 g/mol, more preferably from about 8,000 to about 35,000 g/mol, more preferably from about 10,000 to about 30,000 g/mol.

Typically, the silyl-modified polyethers, preferably having two terminal cross-linkable hydrolysable silyl group, used as polymer P exhibits a viscosity in the range of from about 1 to about 50 Pa s, preferably from about 3 to about 40 Pa s, more preferably from about 5 to about 30 Pa s, more preferably from about 7 to about 20 Pa s. Typically, the viscosity is measured using a Brookfield viscosimeter. For example the Brookfield viscosity (specified in mPa·s) is measured by a Brookfield DV III Ultra viscometer at 24° C.±3° C. at 100 rpm using an appropriate spindle suitable for the viscosity range to be measured, e.g. selected from the Brookfield RV-spindle set. Typically, once the spindle is inserted into the sample, the measurement is started with a constant rotating speed of 100 rpm. The reported Brookfield viscosity values are the values displayed 60 seconds after the start of the measurement.

In a preferred embodiment the silyl-modified polymer P comprises (or preferably consist of) at least one silyl-modified polyether having two terminal methyl dimethoxysilyl groups (e.g. Kaneka MS polymer S203H and/or Kaneka MS polymer 5303H).

Filler F

Preferably the inventive polymer composition comprises at least one filler F in an amount of from 1 to 90% by weight, preferably 20 to 80% by weight, more preferably 30 to 70% by weight, based on the total polymer composition.

Preferably, the at least one filler F is selected from wood meal, walnut shell flour, rice hull flour, pulp, cotton chips, mica, graphite, diatomaceous earth, china clay, kaolin, clay, talc, silica, fumed silica, precipitated silica, silicic anhydride, quartz powder, glass beads, calcium carbonate (e.g. chalk), magnesium carbonate, titanium oxide, ferric oxide, zinc oxide, carbon black, glass balloons, glass fibers and carbon fibers. The filler F may be one or a combination of two or more of the fillers mentioned above. Preferably, the at least one filler is selected from calcium carbonate, silica, carbon black; and combinations thereof. Suitable fillers are also described in U.S. Pat. No. 6,077,896 and EP 1 288 247.

Preferably, the at least one filler F is calcium carbonate, in particular one or more calcium carbonate selected from chalk, marble, limestone, precipitated calcium carbonate (PCC), coated precipitated calcium carbonate, ground calcium carbonate (GCC) (in particular GCC based on chalk, marble and/or limestone) and coated ground calcium carbonate. For example PCC and/or GCC coated with fatty acids can be used as filler F.

Preferably the filler F comprises (or preferably is composed of) at least one calcium carbonate, in particular at least one precipitated calcium carbonate coated with fatty acids.

Additives G

In a preferred embodiment the inventive polymer composition comprises at least one additive G selected from plasticizers G1, adhesion promoters G2, catalysts G3, moisture scavengers G4 and other commonly known additives for SMP sealants. Preferably the inventive polymer composition comprises at least one plasticizer G1, at least one adhesion promoter G2, at least one catalyst G3, and at least one moisture scavenger G4, as additives G.

Such typical additives for SMP sealants and adhesives are for example described in U.S. Pat. No. 6,077,896, EP-A 1 288 247 and US 2003/105261.

Preferably the inventive polymer composition comprises at least one plasticizer G1 in an amount of from 1 to 25% by weight, preferably 5 to 25% by weight, more preferably from 10 to 20% by weight, based on the total polymer composition. Preferably, the at least one plasticizer G1 is selected from phthalate ester plasticizer, such as dimethyl phthalate, diethyl phthalate, dibutyl phthalate, diheptyl phthalate, dioctyl phthalate, diisononyl phthalate, diisodecyl phthalate, di-isododecyl phthalate, butylbenzyl phthalate, dilauryl phthalate and dicyclohexyl phthalate, epoxidized plasticizer, such as epoxidized Soybean oil, epoxidized linseed oil and benzyl epoxy stearate; fatty acid esters, such as alkyl and phenyl esters of $C_4$-$C_{28}$ fatty acids, polyester plasticizers derived from dibasic acids and dihydric alcohols, polyether, such as polypropylene glycol and derivatives thereof; polystyrenes, such as poly-C-methylstyrene and polystyrene; polybutadiene, butadiene-acrylonitrile copolymers, polychloroprene, polyisoprene, polybutene, chlorinated paraffins and the like.

The plasticizer G1 may be one or a combination of two or more of the plasticizers mentioned above.

Preferably, the plasticizer G1 is free of phthalate compounds. Preferably, the plasticizer G1 comprises (or preferably is composed of) at least one $C_{10}$-$C_{21}$ alkanesulfonic acid phenylester (e.g. available as Mesamoll®).

Preferably, the inventive polymer composition comprises at least one adhesion promoter G2 in an amount of from 0.5 to 5% by weight, preferably 0.8 to 3% by weight, more preferably from 1 to 2% by weight, based on the total polymer composition.

Preferably, the at least one adhesion promoter G2 is selected from silane compounds having at least one additional functional group, e.g. selected from amino group, mercapto group, epoxy group, carboxyl group, vinyl group, isocyanate group, isocyanurate, halogen and the like. Typically, the adhesion promoter G2 is selected from epoxysilane, and aminosilane.

For example, the adhesion promoter G2 may be selected from:

- isocyanato group-containing silanes such as γ-isocyanatopropyltrimethoxysilane, γ-isocyanatopropyltriethoxysilane, γ-isocyanatopropylmethyldiethoxysilane and γ-isocyanatopropylmethyldimethoxysilane;
- amino group-containing silanes, for example selected from γ-aminopropyl trimethoxysilane, γ-aminopropyltriethoxysilane, γ-aminopropylmethyldimethoxysilane, γ-aminopropylmethyldiethoxysilane, γ-(2-aminoethyl) aminopropyl trimethoxysilane, γ-(2-aminoethyl)aminopropyl methyldimethoxysilane, γ-(2-aminoethyl) aminopropyl triethoxysilane, γ-(2-aminoethyl) aminopropyl methyldiethoxysilane, γ-ureidopropyl trimethoxysilane, N-phenyl-γ-aminopropyltrimethoxysilane, N-benzyl-γ-aminopropyltrimethoxysilane and N-vinylbenzyl-γ-aminopropyltriethoxysilane;
- mercapto group-containing silanes, such as γ-mercaptopropyltrimethoxysilane, γ-mercaptopropyltriethoxysilane, γ-mercaptopropylmethyldimethoxysilane and γ-mercaptopropylmethyldiethoxysilane;
- epoxy group-containing silanes, such as γ-glycidoxypropyl trimethoxysilane, γ-glycidoxypropyl triethoxysilane, γ-glycidoxypropyl methyldimethoxysilane, β-(3,4-epoxycyclohexyl)ethyl trimethoxysilane and β-(3,4-epoxycyclohexyl)ethyltriethoxysilane;
- carboxysilanes, such as β-carboxyethyltriethoxysilane, β-carboxyethylphenylbis(2-methoxyethoxy)silane and N-8-(carboxymethyl)aminoethyl-γ-aminopropyl trimethoxysilane;
- halogen-containing silanes, such as γ-chloropropyltrimethoxysilane; and
- isocyanurate silanes such as tris(trimethoxysilyl) isocyanurate.

In a preferred embodiment the at least one adhesion promoter G2 is selected from amino group-containing silanes, in particular amino group-containing trimethoxysilanes. Preferably, the at least one adhesion promoter G2 comprises at least one amino group-containing trimethoxysilane, preferably 3-aminopropyltrimethoxysilane (e.g. Dynasylan® AMMO from Degussa Evonik).

Preferably the inventive polymer composition comprises at least one catalyst G3 in an amount of from 0.01 to 3% by weight, preferably 0.1 to 2% by weight, more preferably from 0.2 to 1% by weight, based on the total polymer composition.

Typically the at least one catalyst G3 is selected from commonly known silanol condensation catalyst. Suitable catalyst G3 are for example described in U.S. Pat. No. 6,077,896 and EP 1 288 247.

Such condensing catalyst may be for example tetravalent tin compounds such as dibutyltin dilaurate, dibutyltin phthalate, dibutyltin bisacetylacetonate, dibutyltin diacetate, dibutyltin diethylhexanoate, dibutyltin dioctoate, dibutyltin di(methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate), dioctyltin di(isooctyl maleate), dibutyltin dimethoxide, dibutyltin bisnonylphenoxide and dibutyltin oxide; divalent tin compounds such as stannous octylate, stannous naphthenate and stannous stearate; titanate esters such as tetrabutyl titanate and tetrapropyl titanate; organoaluminum compounds such as aluminum trisacetylacetonate, aluminum tris(ethyl acetoacetate) and diisopropylaluminum ethyl acetoacetate; chelate compounds such as zirconium tetraacetylacetonate and titanium tetraacetylacetonate; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; amine compound-organotin compound reaction products and mixtures, for example laurylamine-stannous octylate reaction products or mixtures; low-molecular-weight polyamide resins obtainable from a polyamine in excess and a polybasic acid; reaction products from a polyamine in excess and an epoxy compound; amino group-containing silane coupling agents such as γ-aminopropyltrimethoxysilane and N—(β-aminoethyl)aminopropylmethyldimethoxysilane; and like silanol condensation catalysts and, further, other known silanol condensation catalysts such as acidic catalysts and basic catalysts.

The catalysts G3 may be one or a combination of two or more of catalysts mentioned above.

Preferably, the at least one catalyst G3 is selected from metal organic compounds based on tetravalent titanium (such as di-isopropoxy titanium bis-acetylacetonate) and/or organic compounds based on tetravalent tin (such as di-alkyl tin bis acetylacetonate compounds, and di-alkyl tin phthalate esters). Such catalysts are for example available from TIB Chemicals. Preferably the catalyst G3 comprises at least one organotin compound, more preferably dibutyltin bis-acetylacetonate and/or dioctyltin bis-acetylacetonate (e.g. TIB KAT 223, dioctyltindiketanoat).

Preferably, the inventive polymer composition comprises at least one moisture scavenger G4 in an amount of from 0.5 to 5% by weight, preferably 1.2 to 5% by weight, more preferably from 1.5 to 3% by weight, based on the total polymer composition.

Preferably, the moisture scavenger G4 is selected from vinylsilanes, in particular vinyl type unsaturated group-containing silanes, such as vinyltrimethoxysilane, vinyltriethoxysilane, γ-methacryloyloxypropylmethyldimethoxysilane and γ-acryloxyloxypropylmethyltriethoxysilane. For example the moisture scavenger G4 is vinyltrimethoxysilane (e.g. Dynasylan® VTMO from Degussa Evonik).

Further, the polymer composition may comprise 0 to 10% by weight of at least further additive G, different from G1, G2, G3 and G4 as well as different from A, B, and C, such as compatibilizers, tackifiers, physical property modifiers, storage stability improving agents, metal deactivators, antiozonants, light stabilizers, heat stabilizers, phosphorus-containing peroxide decomposers, lubricants, pigments (such as $TiO_2$ and carbon black), thixotrope agents (such as polyamide waxes, fumed silica, hydrogenated castor oil), foaming agents, flame retardants and antistatic agents, each in an adequate amount.

Furthermore, the present invention also encompasses a process for preparing the inventive polymer composition, wherein the process comprises mixing the components P and S and optionally F and/or G.

Several processes for preparing SMP sealants are known and described in the state of the art. Typically, the preparation process comprises mixing of the components mentioned above in arbitrary order and kneading the resulting mixture at ordinary temperature or with heating using a mixer, roller, kneader, or the like. The composition can be prepared, for example, by adding the compounds A, B, C, and optionally F and G to the silyl-modified polymer P and effecting uniform dispersion and dissolution, if necessary adjusting the heating and stirring conditions, for instance. Typically, the mixing of the components is carried out in a known apparatus, such as a kneader (planetary mixer), multi-shaft mixer with vacuum and heating system. Further, the preparation process may encompass dissolving one or more of the components using appropriate portions of an appropriate solvent and then mixing up the solutions. If necessary, a dispersion improving agent may be used.

Typically, the SMP polymer compositions are prepared in the absence of air and humidity and are filled in closable containers, such as cartridges, directly after their preparation.

The inventive polymer composition obtained in the above manner can be applied as a one-part curable composition. Such curable composition can be obtained by preparing the polymer composition of the present invention in a substantially moisture free state. When stored in a tightly closed state, such composition can endure long-period storage and, when exposed to atmospheric conditions, it rapidly undergoes curing from the surface.

The curable polymer composition of the present invention is useful as an elastic sealant or adhesive in the fields of building and construction works and in industrial applications. It can also be used as paint, adhesive, poured filler, coating material or the like.

Unless otherwise stated all values given in % are directed to % by weight and all ratio given are based on weight ratio. Unless otherwise stated the term ppm mean mg/kg.

DESCRIPTION OF FIGURES

The FIGS. 1 to 4 shows the results of the statistical models (ANOVA) in view of surface cracking resistance and heat stability.

Figure 1:
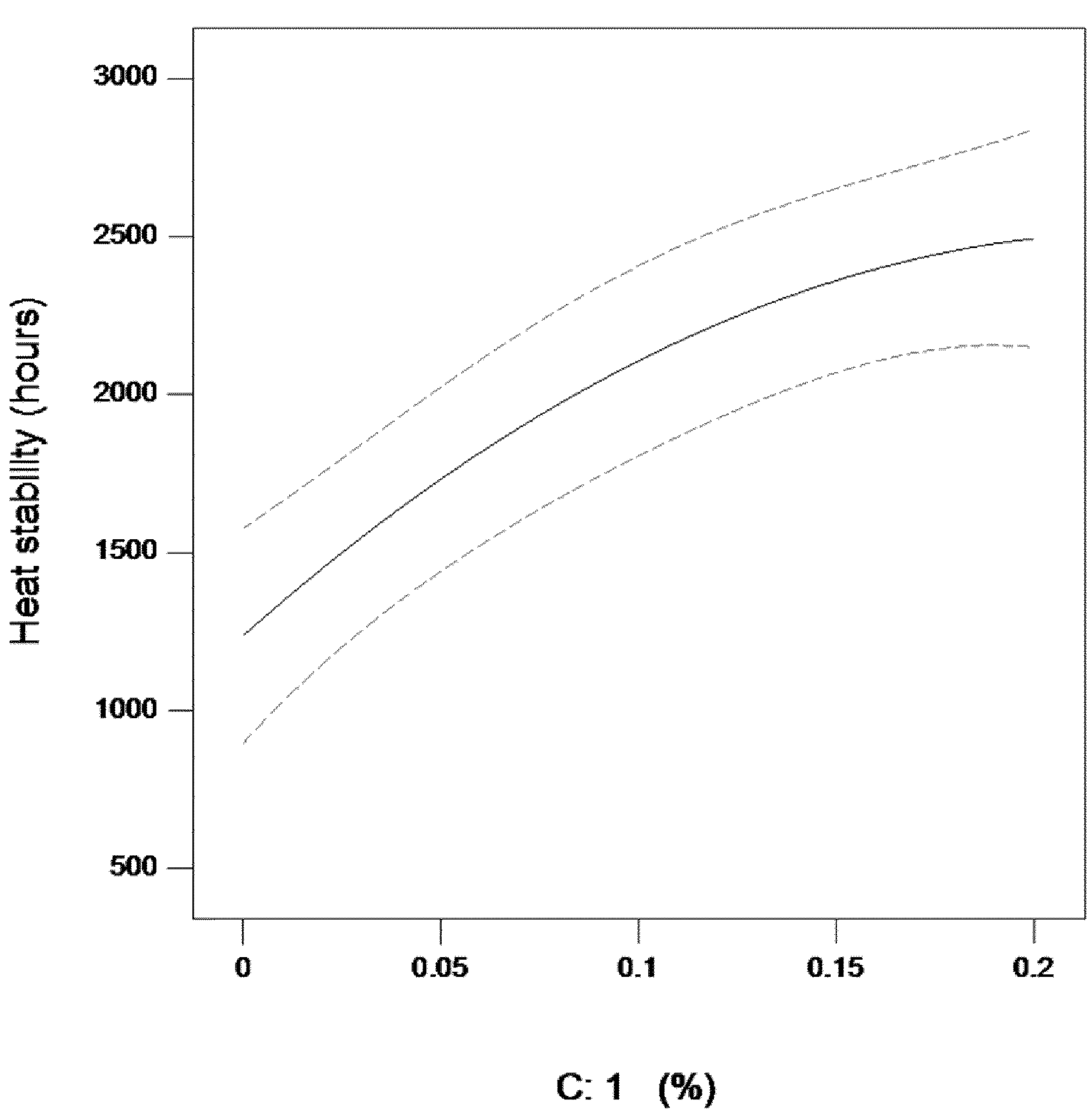
FIG. 1 shows the variation of the heat stability as a function of the concentration of the phenolic antioxidant C1.

The present invention is further illustrated by the following examples and claims.

EXAMPLES

1. Preparation of the Stabilizer Compositions SC

The following stabilizer compositions were prepared by mixing the components in dry solid powder form. The stabilizers components A1, B1 and C1 are as defined below. The filler component D1 is a stearic acid surface treated calcium carbonate with a weight median diameter $d_{50}$ of 1.7 μm, a top cut $d_{90}$ of 8 μm and BET surface area of 4.5 $m^2/g$.

TABLE 1

Stabilizer compositions (all amounts given in % by weight)

| | SC1 | 5C2 | 5C3 |
|---|---|---|---|
| A1 | 36.36 | 45.45 | 33.33 |
| B1 | 27.27 | 45.45 | 33.33 |
| C1 | 18.18 | 9.09 | 33.33 |
| D1 | 18.18 | — | — |

The following SMP compositions were prepared using SMP1 (Kaneka S303H, silyl-terminated polyether) and one of the stabilizer compositions SC1, SC2 or SC3, wherein the components SMP1, F1, G1, G2, G3 and G4 were as described above:

| Component | Amount [g] |
|---|---|
| SMP1 | 29.2 |
| SC1/SC2/SC3 | 0.8 |
| F1 | 52.0 |
| G1 | 14.6 |
| G2 | 0.9 |
| G3 | 0.5 |
| G4 | 2.0 |

Corresponding SMP compositions were prepared using the reference stabilizer R1 or R2 as described below. The preparation of the SMP samples and testing of heat stability and surface cracking resistance were carried out as described below. The results are summarized in the following table 2.

TABLE 2

Results of surface cracking resistance for SMP samples

| No. | Stabilizers | Heat stability 110° C. [hours] | Surface cracking [hours] |
|---|---|---|---|
| Ex. 1/1 | SC1 | 1800 | >2000 |
| Ex. 1/2 | SC2 | 2000 | >2000 |
| Ex. 1/3 | R1 | 1600 | 1500 |
| Ex. 1/4 | R2 | 1600 | 1500 |

2. Preparation and Testing of the SMP Test Samples (Statistical Modelling)

The Following Components were Used:

Component P:

SMP1: Kaneka S303H, silyl-terminated polyether

Stabilizers S:

- A1: UV absorber, 2-Ethyl-2'-ethoxy-oxalanilide (CAS-No. 23949-66-8);
- B1: HALS, reaction product of 2,2,4,4-tetramethyl-7-oxa-3,20-diazadispiro-20-(2,3-epoxi-propyl)dispiro-(5.1.11.2)-heneicosane-21-one and epichlorohydrin, (Hostavin® N30 from Clariant);
- C1: Phenolic antioxidant, bis-(3,3-bis-(4'-hydroxy-3'-tert.butylphenyl)butanoic acid)-glycolester (CAS-No. 32509-66-3);
- R1: Reference 1 is a combination of
  - A2 UV absorber, 2-(2'-Hydroxy-3'-tert-butyl-5'-methylphenyl)-5-chlorobenzotriazole (CAS-No. 3896-11-5), and
  - B2 HALS, bis(2,2,6,6-tetramethyl-4-piperidinyl)decandioate (CAS-No. 52829-07-9)

R2: Reference 2 is Tinuvin® 5866 (from BASF), which is a blend of an UV absorber and a basic HALS, wherein the HALS component bis(1,2,2,6,6-pentamethyl-4-piperidyl) [[3,5-bis(1,1-dimethylethyl)-4-hydroxyphenyl]methyl]butylmalonate is included.

Filler Component F:

F1: Hakuenka® CCR-S10, precipitated calcium carbonate coated with fatty acids

Further Components G:

G1: Plasticizer, Mesamoll®, $C_{10}$-$C_{21}$ alkane sulfonic acid phenylester,

G2: Adhesion promoter, 3-aminopropyltrimethoxysilane (Dynasylan® AMMO, Degussa Evonik);

G3: Catalyst TIB KAT 223, Dioctyltindiketanoat,

G4: Moisture scavenger, vinyltrimethoxysilane (Dynasylan® VTMO, Degussa Evonik);

In a 150 ml speed mixer cup (PP 250 ml), 52.0 g of filler F1 were added to 29.2 g of polymer SMP1 and 14.6 g of plasticizer G1. The mixture was stirred in a SpeedMixer DAC 600.1 FVZ at 2300 rpm for 30 seconds at ambient temperature. Components A1, B1 and C1, in amounts according to tables 3, 4 and 5 below, were added to the resulting mixture and stirred for further 60 seconds at 2300 rpm. Finally, 0.9 g of adhesion promoter G2, 2.0 g of moisture scavenger G4 and 0.5 g of catalyst G3 were added to the resulting mixture and stirred for additional 30 seconds at 2300 rpm. The reference samples Ref.1 to Ref.6 were prepared accordingly using the reference stabilizers R1 and R2.

Heat stability, surface cracking resistance and color were determined for each sample using the testing methods as described in example 5 below.

The following basic formulations as described in table 3 were used:

TABLE 3

Overview of formulations, all amounts given in g

| | | Inventive examples Ex1-Ex15 | Comparative examples Ref1-Ref4 | Comparative examples Ref5-Ref6 |
|---|---|---|---|---|
| | SMP1 | 29.2 | 29.2 | 29.2 |
| | F1 | 52.0 | 52.0 | 52.0 |
| | G1 | 14.6 | 14.6 | 14.6 |
| | G2 | 0.9 | 0.9 | 0.9 |
| | G4 | 2.0 | 2.0 | 2.0 |
| | G3 | 0.5 | 0.5 | 0.5 |
| S | A1 | 0.3-0.5 | | |
| | B1 | 0.3-0.5 | | |
| | C1 | 0.0-0.2 | | |
| | A2 | | | 0.4 |
| | B2 | | | 0.4 |
| | R2 | | 0.8-1.2 | |

The test results are summarized in the following tables 4 and 5.

It is demonstrated that heat stability and surface cracking resistance of reference materials (Ref1 to Ref 6) is met or improved using the inventive combination of UV absorber A1, HALS B1 and phenolic antioxidant C1. Ordinary, the inventive stabilizer combination shows 44% greater heat stability and 67% greater surface cracking resistance compared to the reference examples.

Figure 4:
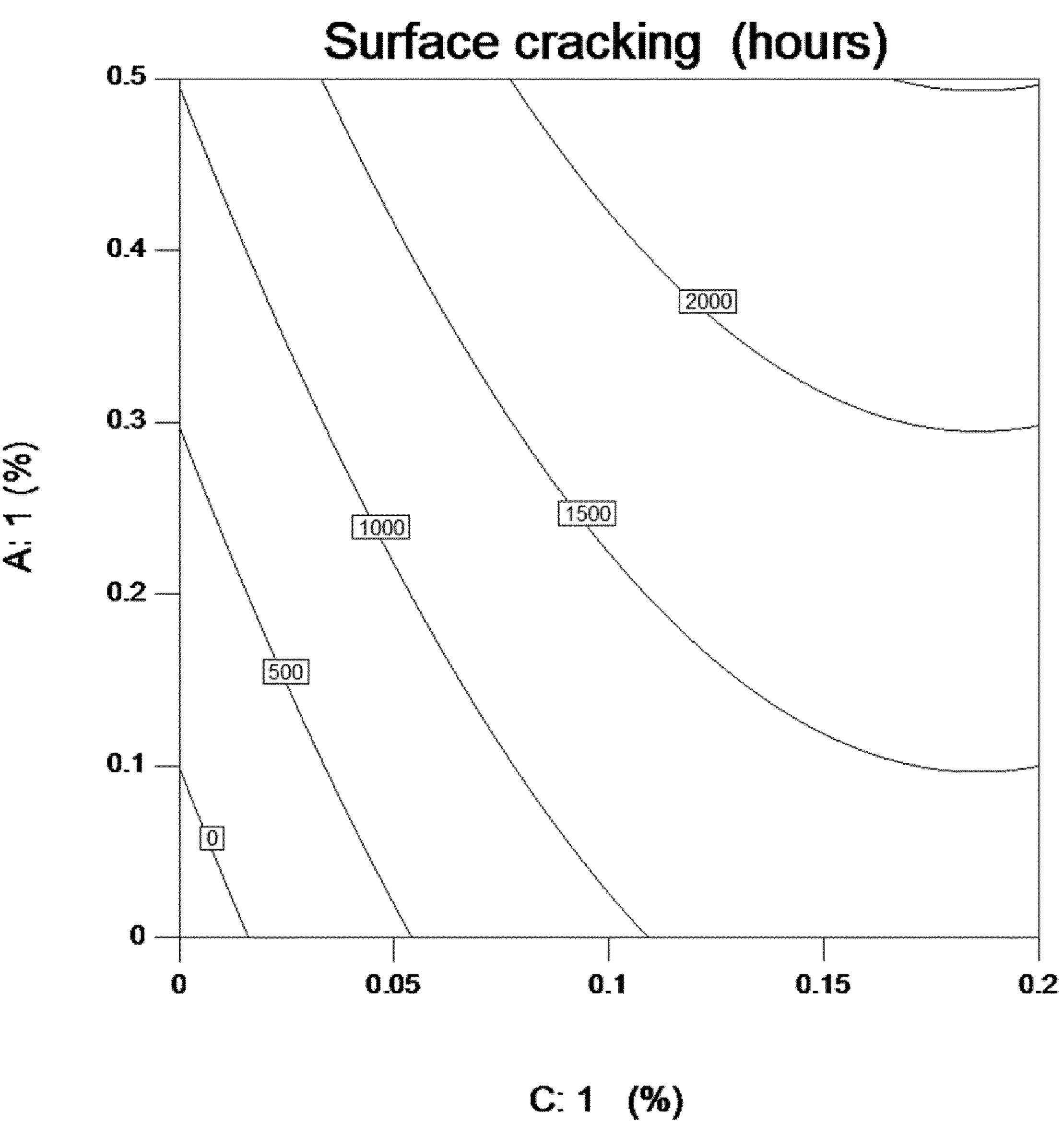
FIG. 4 shows the variation of surface cracking as a function of the concentration of A1 and C1

Further, the experimental data shows (for example as shown in FIG. 4) that the addition of the phenolic antioxidant C1 results in a significant synergistically improvement of heat stability and surface cracking resistance.

The initial Yellowness Index (YI at 0 hours) has no significant variation among the samples. Average YI of 6.29 is in line with the results of Ref1-Ref4 and lower than results of Ref5 to Ref6.

TABLE 4

Experimental plan and results (inventive examples)

| | Stabilizer | | | Heat Stability | UV | | | | | |
|---|---|---|---|---|---|---|---|---|---|---|
| No. | A1 [%] | B1 [%] | C1 [%] | 110° C. [hours] | Stability [hours] | YI 0 h | dE | dL* after 1000 h | da* | db* |
| Ex1 | 0.4 | 0.5 | 0 | 1776 | 1000 | 6.61 | 1.21 | −0.16 | 0.52 | −1.08 |
| Ex2 | 0.5 | 0.4 | 0 | 1608 | 1000 | 6.19 | 1.18 | −0.44 | 0.50 | −0.97 |
| Ex3 | 0.5 | 0.5 | 0.1 | 2976 | 2500 | 6.14 | 0.59 | −0.45 | 0.26 | 0.26 |
| Ex4 | 0.3 | 0.5 | 0.1 | 2184 | 1500 | 5.86 | 0.32 | −0.10 | 0.26 | −0.14 |
| Ex5 | 0.3 | 0.3 | 0.1 | 1776 | 1500 | 5.96 | 0.47 | −0.40 | 0.21 | −0.11 |
| Ex6 | 0.4 | 0.5 | 0.2 | 2880 | 2500 | 6.76 | 0.38 | −0.25 | 0.28 | −0.05 |
| Ex7 | 0.5 | 0.4 | 0.2 | 2784 | 2000 | 6.44 | 0.97 | −0.66 | 0.23 | −0.68 |
| Ex8 | 0.5 | 0.3 | 0.1 | 2352 | 2000 | 6.58 | 0.84 | −0.82 | 0.12 | −0.16 |
| Ex9 | 0.4 | 0.4 | 0.1 | 2616 | 2000 | 6.11 | 0.21 | −0.10 | 0.16 | −0.13 |
| Ex10 | 0.4 | 0.4 | 0.1 | 2616 | 2000 | 6.33 | 0.64 | −0.60 | 0.17 | −0.11 |
| Ex 11 | 0.3 | 0.4 | 0.2 | 2880 | 2000 | 6.24 | 0.78 | −0.53 | 0.26 | 0.51 |
| Ex12 | 0.4 | 0.4 | 0.1 | 2616 | 2000 | 6.30 | 0.77 | −0.70 | 0.29 | −0.99 |
| Ex13 | 0.3 | 0.4 | 0 | 1512 | 500 | 6.56 | 1.17 | −0.60 | 0.38 | −0.93 |
| Ex14 | 0.4 | 0.3 | 0 | 1440 | 500 | 5.76 | 1.19 | −0.94 | 0.47 | −0.56 |
| Ex15 | 0.4 | 0.3 | 0.2 | 2808 | 2500 | 6.57 | 0.83 | −0.27 | 0.20 | 0.75 |

(% is % by weight)

TABLE 5

| Experimental plan and results (comparative examples) | | | | | | | | | | |
|---|---|---|---|---|---|---|---|---|---|---|
| | Stabilizer | | | Heat Stability | UV | | | | | |
| No. | A2 [%] | B2 [%] | R2 [%] | 110° C. [hours] | Stability [hours] | YI 0 h | dE | dL* after 1000 h | da* | db* |
| Ref1 | 0 | 0 | 0.8 | 1776 | 1000 | 6.37 | 1.24 | −0.73 | 0.48 | −0.89 |
| Ref2 | 0 | 0 | 1.0 | 1944 | 1500 | 6.29 | 1.29 | −0.16 | 0.56 | −1.16 |
| Ref3 | 0 | 0 | 1.0 | 1944 | 1500 | 6.52 | 1.30 | −0.39 | 0.50 | −1.14 |
| Ref4 | 0 | 0 | 1.2 | 1944 | 1500 | 5.99 | 1.05 | −0.27 | 0.42 | −0.92 |
| Ref5 | 0.4 | 0.4 | 0 | 1776 | 1500 | 8.42 | 1.02 | −0.01 | 0.37 | −0.95 |
| Ref6 | 0.4 | 0.4 | 0 | 1800 | 1500 | 8.71 | 1.09 | −0.09 | 0.36 | −1.03 |

(% is % by weight)

The test plan and the analysis of the test results were carried out using statistical models using analysis of variance (ANOVA):

FIG. 1 shows the variation of the heat stability as a function of the concentration of the phenolic antioxidant C1, wherein the lines are model predictions.

Figure 2:
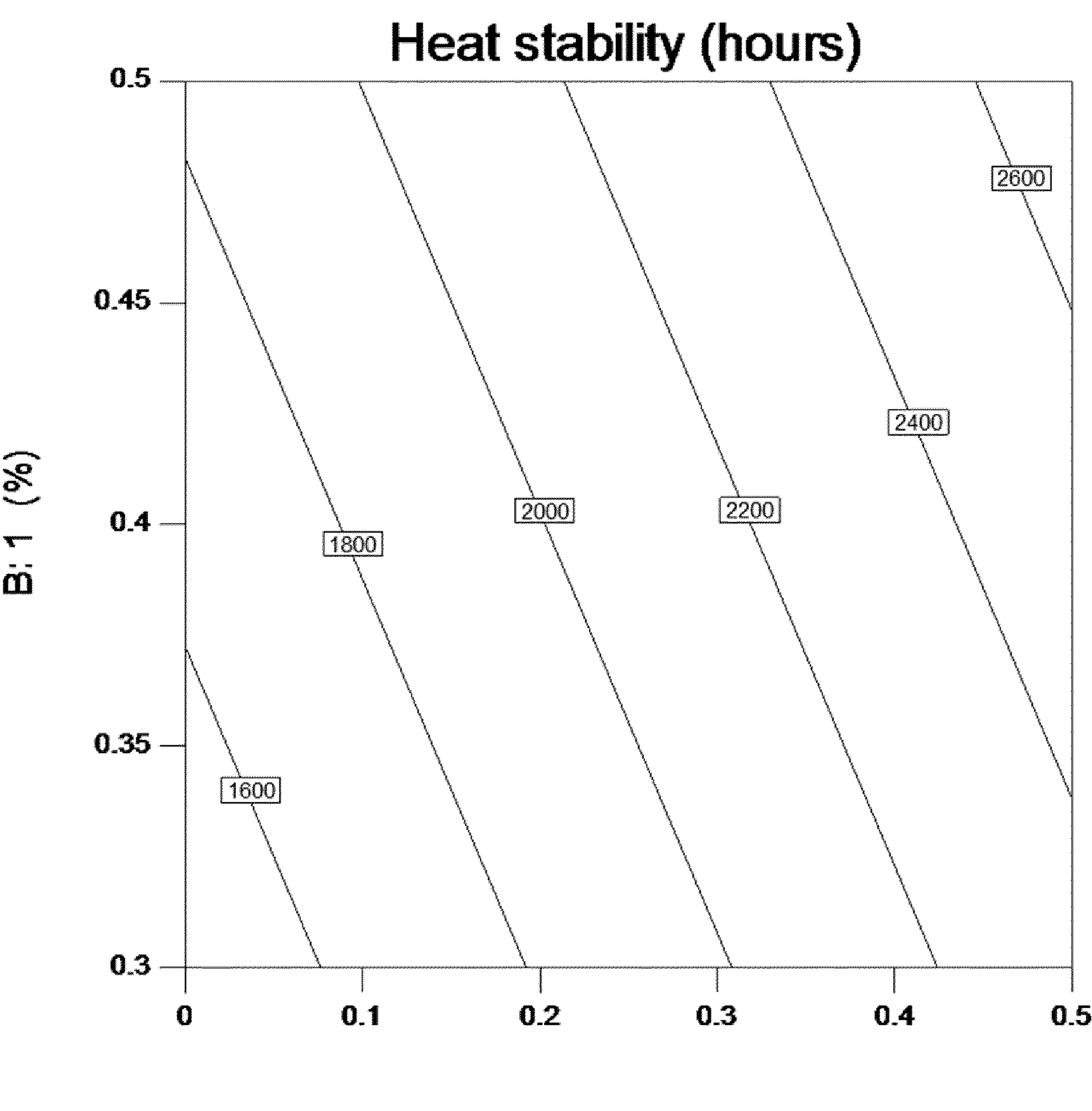
FIG. 2 shows the variation of heat stability as a function of the concentration of HALS component B1 and UV absorber A1, at a constant C1 content of 0.1%.

FIG. 2 shows the variation of heat stability as a function of the concentration of HALS component B1 and UV absorber A1, at a constant C1 content of 0.1%.

Figure 3:
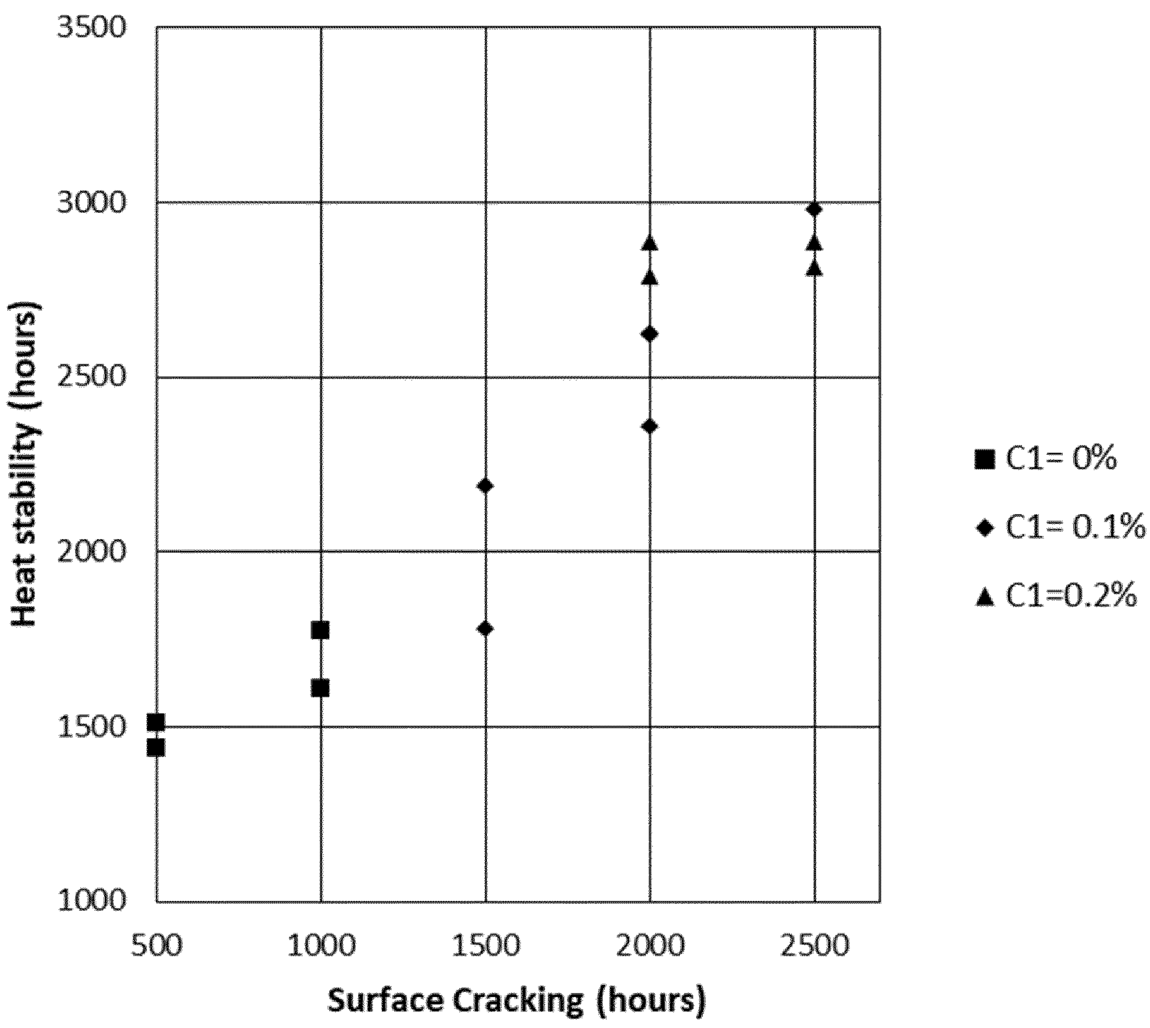
FIG. 3 shows the correlation between surface cracking and heat stability, wherein the C1 loading is 0% (□ square); 0.1% (◇ lozenge) and 0.2% (Δ triangle)

FIG. 3 shows the correlation between surface cracking resistance and heat stability. Points are given for different concentration of phenolic antioxidant C1, i.e. 0% square (□); 0.1% lozenge (◇) and 0.2% triangle (Δ).

FIG. 4 shows the variation of surface cracking as a function of the concentration of UV absorber A1 and phenolic antioxidant C1.

The statistical significance of the content of the stabilizer components A1, B1 and C1 was analyzed via ANOVA. The results were as summarized in the following:

- The concentration of stabilizer component C1 has a strong effect on heat resistance ($p<0.0001$), wherein this tends to level out above concentrations of C1 above 0.2% by weight, preferably 0.1% by weight. The stabilizer component A1 ($p=0.0501$) and stabilizer component B1 ($p=0.0410$) show a comparable statistically relevant effect on heat resistance.
- The stabilizer component C1 has a strong (quadratic) effect on surface cracking resistance (UV stability), wherein this is levelling out at higher concentrations. The stabilizer component A1 has statistically relevant effect ($p=0.0018$) on surface cracking resistance (UV stability), the stabilizer component B1 does not have a statistically relevant effect ($p=0.1759$).
- dE has a significant model which depend mainly on C1 (RSquared 0.672).
- There is a strong correlation (0.95) between surface cracking and heat stability.
- The concentration of the phenolic antioxidant C1 is one important factor in the stabilization of the systems, in particular for the improvement of the surface cracking resistance.

Further, it was surprisingly found that the chemical nature of the phenolic antioxidant is important and that an advantageous synergistic combination is achieved using the phenolic antioxidant C1 in combination with the inventive stabilizer components A and B, in particular A1 and B1.

3. Preparation and Testing of SMP Test Samples (Impact of Antioxidant C)

SMP test samples were prepared based on the components and methods used in example 2. Heat stability, surface cracking resistance and color were determined for each sample using the testing methods as described in example 5. The formulations were based on example Ex4 in table 4 above and are given as follows (all amounts in g):

| | Examples Ex4'-Ex4e [g] |
|---|---|
| SMP1 | 29.2 |
| F1 | 52.0 |
| G1 | 14.6 |
| G2 | 0.9 |
| G4 | 2.0 |
| G3 | 0.5 |
| A | 0.3 |
| B | 0.5 |
| C | 0.1 |

The components SMP1, F1, G1, G2, G4, and G3 are as described above. The following stabilizers A, B, and C are used:

- A1: UV absorber, 2-Ethyl-2'-ethoxy-oxalanilide (CAS-No. 23949-66-8);
- B1: HALS, reaction product of 2,2,4,4-tetramethyl-7-oxa-3,20-diazadispiro-20-(2,3-epoxi-propyl)dispiro-(5.1.11.2)-heneicosane-21-one and epichlorohydrin, (Hostavin® N30 from Clariant);
- B3: Tinuvin®622 (BASF SE), Poly(4-hydroxy-2,2,6,6-tetramethyl-1-piperidineethanol-alt-1,4-butanedioic acid) (CAS-No. 65447-77-0);
- B4: Tinuvin® 44 (BASF SE), Bis(1,2,2,6,6-pentamethyl-4-piperidinyl)-[[3,5-bis(1,1-dimethylethyl)-4-hydroxyphenyl]methyl]butylmalonate (CAS-No. 63843-89-0);
- C1: Phenolic antioxidant, bis-(3,3-bis-(4'-hydroxy-3'-tert.butylphenyl)butanoic acid)-glycolester (CAS-No. 32509-66-3);
- C2: Hostanox® P-EPQ from Clariant, multicomponent system with tetrakis(2,4-di-tert-butylphenyl)-1,1-biphenyl-4,4'-diylbisphosphonite (CAS 38613-77-3) as main component;
- C3: Irganox®1010, Pentaerythritol tetrakis(3-(3,5-di-tert-butyl-4-hydroxyphenyl)propionate), CAS-No. 6683-19-8;
- C4: Tinuvin®144 (BASF SE), Bis(1,2,2,6,6-pentamethyl-4-piperidinyl)-[[3,5-bis(1,1-dimethylethyl)-4-hydroxyphenyl]methyl]butylmalonate (CAS-No. 63843-89-0).

The comparative stabilizer Tinuvin®144 (BASF SE) includes phenolic groups as well as hindered amine groups and was used as comparative phenolic antioxidant C4 and as HALS component B4. The SMP formulations and test results are summarized in the following tables 6 and 7.

TABLE 6

| SMP Formulations Ex4'-Ex4e | | | | | | |
|---|---|---|---|---|---|---|
| | Stabilizer | | | Amount stabilizer wt.-% | | |
| No. | A | B | C | A | B | C |
| Ex4' | A1 | B1 | C1 | 0.3 | 0.5 | 0.1 |
| Ex4a* | A1 | B1 | C2 | 0.3 | 0.5 | 0.1 |
| Ex4b* | A1 | B1 | C3 | 0.3 | 0.5 | 0.1 |
| Ex4c* | A1 | B1 | C4 | 0.3 | 0.5 | 0.1 |
| Ex4d | A1 | B4 | C1 | 0.3 | 0.5 | 0.1 |
| Ex4e | A1 | B3 | C1 | 0.3 | 0.5 | 0.1 |

(*comparative examples)

TABLE 7

| Results Ex4'-Ex4e | | | | | | | | | | | |
|---|---|---|---|---|---|---|---|---|---|---|---|
| | Stabilizer | | | Heat Stability 110° C. | UV Stability | YI | dE | dL* | da* | db* |
| No. | A | B | C | [hours] | [hours] | 0 h | after 1000 h | | | |
| Ex4' | A1 | B1 | C1 | >1950 | >1600 | 6.86 | 2.00 | −1.96 | 0.34 | −0.26 |
| Ex4a* | A1 | B1 | C2 | 1608 | 1000 | 7.16 | 3.10 | 2.85 | 0.47 | −1.12 |
| Ex4b* | A1 | B1 | C3 | 1680 | 1000 | 7.09 | 3.07 | −2.86 | 0.39 | −1.02 |
| Ex4c* | A1 | B1 | C4 | >1950 | 1500 | 7.37 | 1.63 | −1.03 | 0.50 | −1.15 |
| Ex4d | A1 | B4 | C1 | >1950 | >1600 | 6.66 | 1.09 | −0.77 | 0.66 | −0.40 |
| Ex4e | A1 | B3 | C1 | 1940 | 1000 | 6.78 | 2.89 | −2.86 | 0.32 | −0.23 |

The important impact of the chemical nature of the phenolic antioxidant is substantiated by the examples shown above. It was found that an advantageous synergistic combination is achieved using the phenolic antioxidant C1 in combination with the inventive stabilizer components A and B, in particular A1 and B1. The advantageous effect, regarding improved heat stability and improved surface cracking resistance (UV stability) is not achieved using another antioxidant, e.g. comparative stabilizers C2, C3 or C4.

4. Comparative Data

The following polymer compositions were prepared as described in example 2. The basic formulation is described in table 8:

TABLE 8

| Basic formulation of Ex16-Ex28 (amounts given in % by weight) | | | | |
|---|---|---|---|---|
| | | Compound | Commercial name | Amount |
| P | SMP2 | Silyl-modified polymer | Geniosil STP-E35, (Wacker) | 25.0 |
| | F1 Filler | Precipitated calcium carbonate | Hakuenka ® CCR-S10 (Shiraishi-Omya) | 21.4 |
| | F2 Filler | Grounded calcium carbonate | Omyabond 520-OM (Omya) | 21.4 |
| | G5 | Plasticizer | PPG 2000 (VWR) | 25.0 |
| | G2 | Adhesion promoter | Dynasylan ® AMMO, (Degussa Evonik) | 1.0 |
| | G4 | Moisture scavenger | Dynasylan ® VTMO (Degussa Evonik) | 2.0 |
| | G5 | Catalyst | TIB KAT 216 | 0.2 |
| | G6 | Fumed silica | HDK H18 (Wacker) | 2.0 |

TABLE 8-continued

| Basic formulation of Ex16-Ex28 (amounts given in % by weight) | | | | |
|---|---|---|---|---|
| | | Compound | Commercial name | Amount |
| S | A | UV absorber | | 0.5 |
| | B | HALS | | 0.5 |
| | C | Antioxidant | | 1.0 |
| Total | | | | 100 |

The Following Stabilizer Components A, B and C were Used:

Stabilizers S:

A1: UV absorber, 2-Ethyl-2'-ethoxy-oxalanilide (CAS-No. 23949-66-8);

A2: UV absorber, 2-(2'-Hydroxy-3'-tert-butyl-5'-methylphenyl)-5-chlorobenzotriazole (CAS-No. 3896-11-5);

B1: HALS, reaction product of 2,2,4,4-tetramethyl-7-oxa-3,20-diazadispiro-20-(2,3-epoxi-propyl)dispiro-(5.1.11.2)-heneicosane-21-one and epichlorohydrin, (Hostavin® N30 from Clariant);

B5: HALS, mixture of -Beta-alanine, N-(2,2,6,6-tetramethyl-4-piperidinyl)-, dodecyl & tetradecyl;

B6: HALS, propanedioic acid, [(4-methoxyphenyl)-methylene]-, bis(1,2,2,6,6-pentamethyl-4-piperidinyl)ester, CAS-No 147783-69-5;

B7: HALS, N-Acetyl-3-dodecyl-1-(2,2,6,6-tetramethyl-4-piperidinyl) pyrrolidine-2,5-dione;

B8: HALS, 3-dodecyl-1-(2,2,6,6-tetramethyl-4-piperidinyl) pyrrolidine-2,5-dione;

C1: Phenolic antioxidant, bis-(3,3-bis-(4'-hydroxy-3'-tert.butylphenyl)butanoic acid)-glycolester (CAS-No. 32509-66-3);

C2: Hostanox® P-EPQ from Clariant, multicomponent system with tetrakis(2,4-di-tert-butylphenyl)-1,1-biphenyl-4,4'-diylbisphosphonite (CAS 38613-77-3) as main component.

Reference 2 (Ref. 2) (Tinuvin® 5866) was used as comparative material for component A, B and C as well.

The additives, as mentioned above, are used in the concentrations (% by weight) as given in tables 9 and 11. Heat stability (at 110° C. or at 180° C.) and surface cracking resistance were determined for each sample using the testing methods as described below in example 5. The test results are summarized in the following tables 10 and 12.

TABLE 9

Experiments Ex16-Ex26-Variation in stabilizers A and B (amounts given in % by weight)

| No. | Stabilizer A | B | C | Amount A | B | C |
|---|---|---|---|---|---|---|
| Ex16 | A1 | B2 | C2 | 1 | 0.6 | 0.4 |
| Ex17 | A1 | B2 | C2 | 1 | 0.6 | 0.4 |
| Ex18 | A1 | B3 | C2 | 1 | 0.6 | 0.4 |
| Ex19 | A1 | B4 | C2 | 1 | 0.6 | 0.4 |
| Ex20 | A1 | B5 | C2 | 1 | 0.6 | 0.4 |
| Ex21 | A2 | B1 | C2 | 1.2 | 0.4 | 0.4 |
| Ex22 | A1 | B1 | C2 | 1.2 | 0.4 | 0.4 |
| Ex23 | A1 | B1 | C2 | 1 | 0.6 | 0.4 |
| Ex24 | A1 | B1 | none | 1.2 | 0.8 | 0 |
| Ex25 | | Ref.2 | | | 2 | |
| Ex26 | none | none | none | 0 | 0 | 0 |

TABLE 10

Results Ex16-Ex25-Variation in stabilizers A and B

| No. | Heat stability at 110° C. [hours] | Heat stability at 180° C. [hours] | UV stability [hours] |
|---|---|---|---|
| Ex16 | 480 | 2.5 | 800 |
| Ex17 | 480 | 3.0 | 900 |
| Ex18 | 168 | 2.0 | 1000 |
| Ex19 | 24 | 2.0 | 1000 |
| Ex20 | 960 | 2.5 | 1100 |
| Ex21 | 672 | 2.5 | 1000 |
| Ex22 | 960 | 2.0 | 1100 |
| Ex23 | 1200 | 2.0 | 1100 |
| Ex24 | 1200 | 2.0 | 1500 |
| Ex25 | 960 | 6.7 | 1300 |
| Ex26 | 24 | 1.0 | 50 |

TABLE 11

Experiments Ex26-Ex28-Variation in stabilizer C (amounts given in % by weight)

| No. | Stabilizer | | | Amount | | |
|---|---|---|---|---|---|---|
| Ex26 | none | none | none | 0 | 0 | 0 |
| Ex27 | none | none | C2 | 0 | 0 | 0.5 |
| Ex28 | none | none | C1 | 0 | 0 | 0.5 |
| Ex25 | | Ref.2 | | | 2 | |

TABLE 12

Results Ex26-Ex28-Variation in stabilizer C

| No. | Heat stability at 180° C. hours |
|---|---|
| Ex26 | 1.0 |
| Ex27 | 2.0 |
| Ex28 | 10.0 |
| Ex25 | 6.7 |

The sum of all stabilizers A+B+C is 2% by weight in each of the experiments Ex16 to Ex25. It is demonstrated that the heat stability at 110° C. of materials based on UV absorber A1 in combination with HALS B1 is higher than other combination of UV stabilizer and HALS. For example, the heat stability at 110° C. of Ex23 (based on UV absorber A1 in combination with HALS B1) is higher when compared to the material of Ex16-20 (based on combinations with different HALS, i.e. B5, B6, B7, B8). For example, the heat stability at 110° C. of Ex22 (based on UV absorber A1 in combination with HALS B1) is higher when compared to the material of Ex21 (based on different UV absorber A2). Further the heat stability at 110° C. and the UV stability of Ex24 (using UV absorber A1 in combination with HALS B1) is better when compared to the reference material Ex25 (using reference 2, Tinuvin® 5866).

It is further demonstrated that the phosphonite antioxidant C2 in combination of A1 and B1 does not result in improved heat stability at 110° C. or improved UV stability (comparing examples Ex24 and Ex22).

The heat stability at 180° C. of SMP-materials based on antioxidant C1 (Ex28) is significantly higher than of materials based on antioxidant C2 (Ex27) and reference material Ex25 (using reference 2, Tinuvin® 5866).

5. Testing Methods

Heat Stability

The heat stability of the SMP samples, prepared as described above, was tested by the following procedure. 25×25×2 mm specimens were cut from the cured film and placed on a cardboard panel, to ensure a homogenous temperature. The panel was placed in the central section of an oven, preheated at a set temperature of either 110° C. (Memmert UF30 ventilated oven) or at 180° C. (non-ventilated oven). The oven was operated in laboratory environment at controlled temperature of 23±1° C. and controlled humidity of 50±5%. The samples were checked periodically. At 110° C. the maximum interval between observations was 100 hours. At 180° C. the maximum interval between observations was 1 hours. A sample was classified as "failed" at the first signs of cracking and removed from the oven. The heat stability is given in hours until failure, as reported in the tables above.

Surface Cracking Resistance

The UV stability (surface cracking resistance) of the SMP samples prepared as described above was determined using weather-o-meter (WoM) according to ISO 4892-2 E2013 wet/dry. The cured samples were exposed to UV radiations with cycles of 102 minutes dry period followed by 18 minutes of water spray with fresh demineralized water. The radiation intensity was 60 $W/m^2$ (300-400 nm). The tests were carried out in accordance with ISO 4892-2 E2013 at 50% relative humidity, and a temperature of 65° C.+/−3° C. (black standard).

The samples were checked every 500 hours, till 2000 hours including visual check of surface cracks and color measurement. A sample was recorded as "failed" when surface crack was visible. The surface cracking resistance is given in hours until failure. Samples with only small cracks at 2000 hours were assigned a "failure" of 2500 hours.

Yellowing

The Yellowness Index (YI) of the test samples were measured without thermal treatment according to ASTM E313. Furthermore, color measurement based on CIE color system was done before and after 1000 h of thermal exposure at 110° C. in a ventilated oven. CIE LAB values L*, a* and b* as well as dE, were determined using a Spectrophotometer Minolta CM-3600d, calibration with Zero box and white reference plate, wherein L*defines lightness, a* denotes the red/green value and b* the yellow/blue value. The differences of CIE LAB values before and after thermal treatment are given in the tables above.

Weight Median Particle Diameter $d_{50}$ Value

Throughout the present invention, $d_{50}$ is the weight median particle diameter by weight, for all particulate materials other than surface-reacted calcium carbonate i.e. representing the particle size so that 50 wt.-% of the particles are coarser or finer.

The weight median particle diameter was measured according to the sedimentation method. The sedimentation method is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and supersonic.

Specific Surface Area (BET)

The specific surface area was measured using nitrogen and the BET method according to ISO 9277:2010.

The invention claimed is:

1. A stabilizer composition comprising:

(A) from 33 to 46% by weight, based on the total stabilizer composition, of an UV absorber as component A, wherein the UV absorber component A is the oxalanilide compound according to formula (I)-1

(I)-1

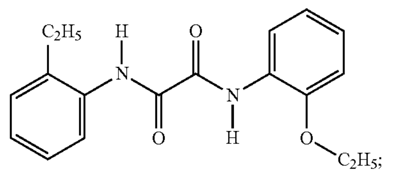

(B) from 33 to 46% by weight, based on the total stabilizer composition, a hindered amine light stabilizer as component B, wherein the hindered light stabilizer component B is selected from 2-dodecyl-N-(2,2,6,6-tetramethyl-4-piperidinyl) succinimide, bis(2,2,6,6-tetramethyl-4-piperidinyl)sebacat, bis(1,2,2,6,6-pentamethyl-4-piperidinyl)sebacat, bis(1-octyloxy-2,2,6,6-tetramethyl-4-piperidinyl)sebacat, 2,2,4,4-tetramethyl-7-oxa-3,20-15 diazadispiro-20-(2,3-epoxi-propyl) dispiro-(5.1.11.2)-heneicosane-21-one, the reaction product of 2,2,4,4-tetramethyl-7-oxa-3,20-diazadispiro-20-(2,3-epoxi-propyl)dispiro-(5.1.11.2)-heneicosane-21-one and epichlorohydrin and mixtures thereof;

(C) from 9 to 23% by weight, based on the total stabilizer composition, an antioxidant as component C, wherein the antioxidant component C is bis-(3,3-bis-(4'-hydroxy-3'-tert-butyl-phenyl)butanoic acid)-glycolester;

(D) optionally at least one diluent as component D comprising solid inorganic powders selected from talc, mica, dolomite, kaolin, silica, calcium carbonate, magnesium carbonate, titanium oxide, iron oxide, zinc oxide, carbon black, or liquid diluents selected from solvents or liquid plasticizers; and (E) optionally at least one further additive as component E, selected from antistatic agents, flame proofing agents, softeners, nucleating agents, metal deactivators, biocides, impact modifiers, pigments, fungicides, and bactericides, wherein the stabilizer composition does not comprise pentaerythritol tetrakis(3-(3,5-di-tert-butyl-4-hydroxyphenyl)propionate), and wherein the UV absorber A and the antioxidant C are present in a weight-to-weight ratio A:C of from 5:1 to 1.5:1.

2. The stabilizer composition according to claim 1, wherein the stabilizer composition further comprises from 1 to 30% by weight, based on the total stabilizer composition, of the at least one diluent D selected from talc, mica, dolomite, kaolin, silica, calcium carbonate, magnesium carbonate, titanium oxide, iron oxide, zinc oxide, and carbon black.

3. The stabilizer composition according to claim 1, wherein the stabilizer composition consists of:

the UV absorber A;

the hindered amine light stabilizer B;

the antioxidant C;

optionally, the at least one diluent as component D; and optionally, the at least one further additive as component E.

4. The stabilizer composition according to claim 1, wherein the hindered amine light stabilizer component B is the reaction product of 2,2,4,4-tetramethyl-7-oxa-3,20-diazadispiro-20-(2,3-epoxi-propyl)dispiro-(5.1.11.2)-heneicosane-21-one and epichlorohydrin.

5. A process for preparing a stabilizer composition according to claim 1, wherein the components A, B, C, and optionally D and/or E are mixed.

6. A sealant or adhesive based on silyl-modified polymers comprising a stabilizer composition according to claim 1 as stabilizer in the sealant or adhesive based on silyl-modified polymers, wherein the sealant or adhesive does not comprise pentaerythritol tetrakis(3-(3,5-di-tert-butyl-4-hydroxyphenyl) propionate).

* * * * *